United States Patent
Li et al.

(10) Patent No.: US 11,115,999 B2
(45) Date of Patent: Sep. 7, 2021

(54) INFORMATION TRANSMISSION METHOD, BASE STATION, AND USER EQUIPMENT

(71) Applicant: HUAWEI TECHNOLOGIES CO., LTD., Guangdong (CN)

(72) Inventors: Chao Li, Beijing (CN); Xingwei Zhang, Beijing (CN); Jie Shi, Shenzhen (CN); Yinghua Sun, Shenzhen (CN); Zhe Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/271,160

(22) Filed: Feb. 8, 2019

(65) Prior Publication Data
US 2019/0174535 A1 Jun. 6, 2019

Related U.S. Application Data

(63) Continuation of application No. PCT/CN2016/094708, filed on Aug. 11, 2016.

(51) Int. Cl.
| | |
|---|---|
| *H04W 72/14* | (2009.01) |
| *H04B 1/76* | (2006.01) |
| *H04W 72/12* | (2009.01) |

(52) U.S. Cl.
CPC .............. *H04W 72/14* (2013.01); *H04B 1/76* (2013.01); *H04W 72/1268* (2013.01)

(58) Field of Classification Search
CPC ......... H04W 72/0446; H04W 72/1263; H04W 72/1268; H04W 72/1278; H04B 1/76; H04L 5/0044
See application file for complete search history.

(56) References Cited

U.S. PATENT DOCUMENTS

| | | | |
|---|---|---|---|
| 6,418,148 B1 | 7/2002 | Kumar et al. | |
| 10,623,155 B2* | 4/2020 | Kim | ...................... H04L 5/0048 |

(Continued)

FOREIGN PATENT DOCUMENTS

| | | |
|---|---|---|
| CN | 101399632 A | 4/2009 |
| CN | 101500311 A | 8/2009 |

(Continued)

OTHER PUBLICATIONS

Nogami et al. U.S. Appl. No. 62/311,219, filed Mar. 21, 2016 (Year: 2016).*

(Continued)

*Primary Examiner* — Wutchung Chu
(74) *Attorney, Agent, or Firm* — Fish & Richardson P.C.

(57) ABSTRACT

A method includes: receiving first information, where the first information is used to instruct UE to send second information; obtaining a first parameter value, where the first parameter value indicates a location relationship between a first time domain resource and a second time domain resource, the first time domain resource is a time domain resource in which the first information is located, the second time domain resource is a time domain resource in which the second information is located, duration of the second time domain resource in time domain is not longer than one subframe, and an interval between the second time domain resource and the first time domain resource is shorter than four subframes; and determining the second time domain resource based on the first parameter value, and sending the second information on the second time domain resource.

24 Claims, 14 Drawing Sheets

(56) References Cited

U.S. PATENT DOCUMENTS

| | | |
|---|---|---|
| 2009/0323664 A1 | 12/2009 | Li et al. |
| 2010/0103885 A1* | 4/2010 | Cordeiro ............... H04W 74/06 |
| | | 370/329 |
| 2010/0329142 A1* | 12/2010 | Hao .................. H04W 72/1284 |
| | | 370/252 |
| 2012/0127940 A1 | 5/2012 | Lee et al. |
| 2012/0178449 A1 | 7/2012 | Liao |
| 2012/0250672 A1 | 10/2012 | Cordeiro et al. |
| 2015/0018010 A1* | 1/2015 | Fischer ................ G01S 5/0236 |
| | | 455/456.2 |
| 2016/0044653 A1* | 2/2016 | Bagheri ............... H04W 76/14 |
| | | 370/329 |
| 2016/0183294 A1 | 6/2016 | Noh et al. |
| 2017/0041904 A1* | 2/2017 | Suzuki ................. H04L 5/0053 |
| 2017/0142712 A1* | 5/2017 | Lee ...................... H04L 5/0094 |
| 2017/0164363 A1* | 6/2017 | Zhang ................. H04L 47/286 |
| 2017/0251466 A1* | 8/2017 | Astely ................. H04L 5/0055 |
| 2017/0273071 A1* | 9/2017 | Nogami ............. H04W 74/085 |
| 2017/0289992 A1* | 10/2017 | Sun ...................... H04L 5/0051 |
| 2017/0338988 A1* | 11/2017 | Yin ...................... H04L 5/0082 |
| 2018/0014323 A1* | 1/2018 | Huang .................. H04L 5/001 |
| 2018/0048451 A1* | 2/2018 | Yin .................. H04W 72/0446 |
| 2018/0049226 A1* | 2/2018 | Chen .................... H04L 5/0055 |
| 2018/0359068 A1* | 12/2018 | Kim ...................... H04W 72/14 |
| 2019/0081765 A1* | 3/2019 | Si ......................... H04W 72/04 |
| 2019/0132860 A1* | 5/2019 | Bhorkar ............... H04L 5/0053 |
| 2019/0174430 A1* | 6/2019 | Gao .................... H04W 52/281 |
| 2019/0174440 A1* | 6/2019 | Kwak ................. H04W 56/001 |
| 2019/0174493 A1* | 6/2019 | Horiuchi .............. H04W 52/34 |
| 2019/0230657 A1* | 7/2019 | Kim ..................... H04W 76/27 |
| 2019/0274154 A1* | 9/2019 | Shi ........................ H04L 27/26 |
| 2019/0289586 A1* | 9/2019 | Ouchi .................. H04W 72/04 |
| 2019/0342864 A1* | 11/2019 | Hwang ................ H04L 5/0053 |
| 2019/0394773 A1* | 12/2019 | Gao ................. H04W 72/0446 |

FOREIGN PATENT DOCUMENTS

| | | |
|---|---|---|
| CN | 101615928 A | 12/2009 |
| CN | 101616118 A | 12/2009 |
| CN | 101902268 A | 12/2010 |
| CN | 102281229 A | 12/2011 |
| CN | 103997788 A | 8/2014 |
| CN | 105337706 A | 2/2016 |
| EP | 2587877 A1 | 5/2013 |
| EP | 3493580 A1 | 6/2019 |
| KR | 20170114071 A | 10/2017 |
| RU | 2531371 C2 | 10/2014 |
| WO | 2016029736 A1 | 3/2016 |
| WO | 2016068563 A1 | 5/2016 |
| WO | 2018021203 A1 | 2/2018 |

OTHER PUBLICATIONS

Ouchi et al. JP2019125816A translated (Year: 2016).*
Office Action issued in Chinese Application No. 201680087896.9 dated Sep. 3, 2019, 22 pages (With English Translation).
Ericsson, New Work Item on shortened TTI and processing time for LTE. 3GPP TSG RAN Meeting #72 Busan, Korea, Jun. 13-16, 2016, RP-161299, 9 pages.
3GPP TS 36.213 V13.2.0 (Jun. 2016), 3rd Generation Partnership Project;Technical Specification Group Radio Access Network;Evolved Universal Terrestrial Radio Access (E-UTRA);Physical layer procedures(Release 13), 381 pages.
3GPP TS 36.331 V13.2.0 (Jun. 2016), 3rd Generation Partnership Project;Technical Specification Group Radio Access Network;Evolved Universal Terrestrial Radio Access (E-UTRA);Radio Resource Control (RRC);Protocol specification (Release 13), 621 pages.
International Search Report and Written Opinion issued in International Application No. PCT/CN2016/094708 dated May 5, 2017, 19 pages.
Office Action issued in Russian Application No. 2019106508/07 dated Dec. 13, 2019, 9 pages (with English translation).
Search Report issued in Russian Application No. 2019106508/07 dated Dec. 12, 2019, 4 pages (with English translation).
Catt, "Design of sPUCCH for shortened TTI," 3GPP TSG RAN WG1 Meeting #84bis, R1-162298; Busan, Korea, Apr. 11-15, 2016, 3 pages.
Huawei, HiSilicon, "Processing time reduction and related procedures for 1ms TTI," 3GPP TSG RAN WG1 Meeting #86, R1-166159; Gothenburg, Sweden, Aug. 22-26, 2016, 8 pages.
Office Action issued in Japanese Application No. 2019-507141 dated Mar. 9, 2020, 9 pages (with English translation).
Office Action issued in Chinese Application No. 201680087896.9 dated Apr. 1, 2020, 9 pages (With English Translation).
Extended European Search Report issued in European Application No. 16912273.6 dated May 24, 2019, 11 pages.
Lenovo, "Frame structure design for next radio interface," 3GPP TSG RAN WG1 Meeting #84bis, R1-162742, Busan, Korea, Apr. 11-15, 2016, 3 pages.
Office Action issued in Korean Application No. 2019-7006143 dated May 15, 2020, 9 pages (with English translation).
Office Action issued in Korean Application No. 2019-7006143 dated Nov. 30, 2020, 5 pages.

* cited by examiner

INFORMATION TRANSMISSION METHOD, BASE STATION, AND USER EQUIPMENT

CROSS-REFERENCE TO RELATED APPLICATIONS

This application is a continuation of International Application No. PCT/CN2016/094708, filed on Aug. 11, 2016, the aforementioned patent application is hereby incorporated by reference in its entirety.

TECHNICAL FIELD

The present invention relates to the communications field, and more specifically, to an information transmission method, a base station, and user equipment.

BACKGROUND

With development of society, users have higher requirements on a wireless communications technology. In wireless communication, a transmission rate and a transmission delay are key indicators. During transmission of a data packet of a fixed size, if a time occupied by the transmission is shorter, a communications system can support more users or can support concurrent transmission of more data. In addition, from a perspective of user experience, a shorter delay brings about a higher transmission speed, a larger user capacity, and better user experience.

Physically, reducing a delay in a Long Term Evolution (LTE) system is considered as shortening a time interval between two transmissions, or reducing a time occupied by each transmission. For example, during transmission in LTE, a basic unit of a time domain resource is one millisecond (ms), and an interval between two transmissions is not shorter than 4 ms.

After the transmission delay is reduced, a technical problem to be resolved urgently is how to perform data transmission to improve transmission efficiency of the communications system.

SUMMARY

Embodiments of the present invention provide an information transmission method, an information receiving method, a base station, and user equipment to improve transmission efficiency of a communications system while reducing a transmission delay.

According to a first aspect, an information transmission method is provided, and the method includes: receiving first information, where the first information is used to instruct UE to send second information; obtaining a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes; and determining the second time domain resource based on the first parameter value, and sending the second information on the second time domain resource.

With reference to the first aspect, in a first possible implementation, that the first parameter value is used to indicate a location relationship between a first time domain resource and a second time domain resource includes: the first parameter value is a first time domain interval between the first time domain resource and the second time domain resource.

With reference to the first aspect or the foregoing implementation, in a second possible implementation of the first aspect, a specific implementation of the determining the second time domain resource based on the first parameter value is: determining the second time domain resource based on the first time domain interval and the first time domain resource.

With reference to the first aspect or the foregoing implementation, in a third possible implementation of the first aspect, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

With reference to the first aspect or the foregoing implementation, in a fourth possible implementation of the first aspect, the first parameter value is an index of a mapping relationship corresponding to the first parameter value; or the first parameter value is a minimum time domain interval in a predefined mapping relationship corresponding to the first parameter value; where the mapping relationship includes a correspondence between a location of the first time domain resource and a first time domain interval, and the first time domain interval is a time domain interval between the first time domain resource and the second time domain resource.

With reference to the first aspect or the foregoing implementation, in a fifth possible implementation of the first aspect, a specific implementation of the determining the second time domain resource based on the first parameter value is: determining the mapping relationship corresponding to the first parameter value; determining, according to the mapping relationship, the first time domain interval corresponding to the first time domain resource; and determining the second time domain resource based on the first time domain interval and the first time domain resource.

With reference to the first aspect or the foregoing implementation, in a sixth possible implementation of the first aspect, when a carrier used by the UE to send the second information is a TDD carrier, a specific implementation of the determining, according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

With reference to the first aspect or the foregoing implementation, in a seventh possible implementation of the first aspect, duration of the first time domain resource and the duration of the second time domain resource are equal to duration of a time domain unit of the first time domain interval.

With reference to the first aspect or the foregoing implementation, in an eighth possible implementation of the first aspect, duration of the first time domain resource and the duration of the second time domain resource are equal to any one of the following: duration of one subframe in time domain; or duration of one timeslot in time domain; or duration of two symbols in time domain; or duration of four symbols in time domain.

With reference to the first aspect or the foregoing implementation, in a ninth possible implementation of the first aspect, the duration of the second time domain resource is shorter than or equal to duration of a time domain unit of the first time domain interval.

With reference to the first aspect or the foregoing implementation, in a tenth possible implementation of the first aspect, the time domain unit of the first time domain interval is a subframe; the method further includes: obtaining a second parameter value, where the second parameter value is used to indicate a location of the second time domain resource in a second subframe, and the second subframe is a subframe in which the second time domain resource is located; and a specific implementation of the determining the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

With reference to the first aspect or the foregoing implementation, in an eleventh possible implementation of the first aspect, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of the determining the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

With reference to the first aspect or the foregoing implementation, in a twelfth possible implementation of the first aspect, a specific implementation of the determining the second time domain resource based on the first time domain interval and the first time domain resource is: determining a time domain resource that is after the first time domain resource and is separated from the first time domain resource by the first time domain interval, as the second time domain resource.

With reference to the first aspect or the foregoing implementation, in a thirteenth possible implementation of the first aspect, a specific implementation of the determining the second time domain resource based on the first time domain interval and the first time domain resource is: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource; or if the third time domain resource is a downlink time domain resource or an unavailable time domain resource, determining a first available uplink time domain resource after the third time domain resource as the second time domain resource.

With reference to the first aspect or the foregoing implementation, in a fourteenth possible implementation of the first aspect, a specific implementation of the obtaining a first parameter value is: obtaining indication information, where the indication information corresponds to the first parameter value; and determining the first parameter value according to the indication information; where the indication information is any one of the following: a maximum transmission timing advance TA value of the UE, a maximum transport block size TBS value of the UE, transmission mode information of the UE, capability information of the UE, or a duration type of the second time domain resource.

With reference to the first aspect or the foregoing implementation, in a fifteenth possible implementation of the first aspect, the first information is scheduling information, and the second information is uplink data information scheduled according to the scheduling information; or the first information is scheduling information, and the second information is uplink control information scheduled according to the scheduling information; or the first information is downlink control information, and the second information is feedback information about the downlink control information; or the first information is downlink data information, and the second information is acknowledgement information about the downlink data information.

According to a second aspect, user equipment is provided, and the user equipment includes a sending module, a receiving module, and a processing module, where the receiving module is configured to receive first information, where the first information is used to instruct the UE to send second information; the processing module is configured to obtain a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes; the processing module is further configured to determine the second time domain resource based on the first parameter value; and the sending module is configured to send the second information on the second time domain resource.

With reference to the second aspect, in a first possible implementation, that the first parameter value is used to indicate a location relationship between a first time domain resource and a second time domain resource includes: the first parameter value is a first time domain interval between the first time domain resource and the second time domain resource.

With reference to the second aspect or the foregoing implementation, in a second possible implementation of the second aspect, a specific implementation of determining, by the processing module, the second time domain resource based on the first parameter value is: determining the second time domain resource based on the first time domain interval and the first time domain resource.

With reference to the second aspect or the foregoing implementation, in a third possible implementation of the second aspect, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

With reference to the second aspect or the foregoing implementation, in a fourth possible implementation of the second aspect, the first parameter value is an index of a mapping relationship corresponding to the first parameter value; or the first parameter value is a minimum time domain interval in a predefined mapping relationship corresponding to the first parameter value; where the mapping relationship includes a correspondence between a location of the first time domain resource and a first time domain interval, and the first time domain interval is a time domain interval between the first time domain resource and the second time domain resource.

With reference to the second aspect or the foregoing implementation, in a fifth possible implementation of the second aspect, a specific implementation of determining, by the processing module, the second time domain resource based on the first parameter value is: determining the mapping relationship corresponding to the first parameter value; determining, according to the mapping relationship, the first time domain interval corresponding to the first time domain resource; and determining the second time domain resource based on the first time domain interval and the first time domain resource.

With reference to the second aspect or the foregoing implementation, in a sixth possible implementation of the second aspect, when a carrier used by the UE to send the second information is a TDD carrier, a specific implementation of determining, according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

With reference to the second aspect or the foregoing implementation, in a seventh possible implementation of the second aspect, duration of the first time domain resource and the duration of the second time domain resource are equal to duration of a time domain unit of the first time domain interval.

With reference to the second aspect or the foregoing implementation, in an eighth possible implementation of the second aspect, duration of the first time domain resource and the duration of the second time domain resource are equal to any one of the following: duration of one subframe in time domain; or duration of one timeslot in time domain; or duration of two symbols in time domain; or duration of four symbols in time domain.

With reference to the second aspect or the foregoing implementation, in a ninth possible implementation of the second aspect, the duration of the second time domain resource is shorter than or equal to duration of a time domain unit of the first time domain interval.

With reference to the second aspect or the foregoing implementation, in a tenth possible implementation of the second aspect, the time domain unit of the first time domain interval is a subframe; the processing module is further configured to obtain a second parameter value, where the second parameter value is used to indicate a location of the second time domain resource in a second subframe, and the second subframe is a subframe in which the second time domain resource is located; and a specific implementation of determining, by the processing module, the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

With reference to the second aspect or the foregoing implementation, in an eleventh possible implementation of the second aspect, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of determining, by the processing module, the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

With reference to the second aspect or the foregoing implementation, in a twelfth possible implementation of the second aspect, a specific implementation of determining, by the processing module, the second time domain resource based on the first time domain interval and the first time domain resource is: determining a time domain resource that is after the first time domain resource and is separated from the first time domain resource by the first time domain interval, as the second time domain resource.

With reference to the second aspect or the foregoing implementation, in a thirteenth possible implementation of the second aspect, a specific implementation of determining, by the processing module, the second time domain resource based on the first time domain interval and the first time domain resource is: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource; or if the third time domain resource is a downlink time domain resource or an unavailable time domain resource, determining a first available uplink time domain resource after the third time domain resource as the second time domain resource.

With reference to the second aspect or the foregoing implementation, in a fourteenth possible implementation of the second aspect, a specific implementation of obtaining, by the processing module, the first parameter value is: obtaining indication information, where the indication information corresponds to the first parameter value; and determining the first parameter value according to the indication information; where the indication information is any one of the following: a maximum transmission timing advance TA value of the UE, a maximum transport block size TBS value of the UE, transmission mode information of the UE, capability information of the UE, or a duration type of the second time domain resource.

With reference to the second aspect or the foregoing implementation, in a fifteenth possible implementation of the second aspect, the first information is scheduling information, and the second information is uplink data information scheduled according to the scheduling information; or the first information is scheduling information, and the second information is uplink control information scheduled according to the scheduling information; or the first information is downlink control information, and the second information is feedback information about the downlink control information; or the first information is downlink data information, and the second information is acknowledgement information about the downlink data information.

According to a third aspect, another user equipment is provided and includes a processor, a transmitter, and a receiver, where the processor is configured to perform the method in any one of the first aspect or the possible implementations of the first aspect by using the transmitter and the receiver.

According to a fourth aspect, a computer-readable storage medium is provided and is configured to store a computer program, where the computer program includes an instruction used to perform the method in any one of the first aspect or the possible implementations of the first aspect.

According to a fifth aspect, an information transmission method is provided, and the method includes: sending first information, where the first information is used to instruct UE to send second information; sending a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes; and determining the second time domain resource, and receiving the second information on the second time domain resource.

With reference to the fifth aspect, in a first possible implementation, that the first parameter value is used to indicate a location relationship between a first time domain resource and a second time domain resource includes: the first parameter value is a first time domain interval between the first time domain resource and the second time domain resource.

With reference to the fifth aspect or the foregoing implementation, in a second possible implementation of the fifth aspect, a specific implementation of the determining the second time domain resource is: determining the second time domain resource based on the first time domain interval and the first time domain resource.

With reference to the fifth aspect or the foregoing implementation, in a third possible implementation of the fifth aspect, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

With reference to the fifth aspect or the foregoing implementation, in a fourth possible implementation of the fifth aspect, the first parameter value is an index of a mapping relationship corresponding to the first parameter value; or the first parameter value is a minimum time domain interval in a predefined mapping relationship corresponding to the first parameter value.

With reference to the fifth aspect or the foregoing implementation, in a fifth possible implementation of the fifth aspect, a specific implementation of the determining the second time domain resource is: determining the mapping relationship corresponding to the first parameter value; determining, according to the mapping relationship, the first time domain interval corresponding to the first time domain resource; and determining the second time domain resource based on the first time domain interval and the first time domain resource.

With reference to the fifth aspect or the foregoing implementation, in a sixth possible implementation of the fifth aspect, when a carrier used by the UE to send the second information is a TDD carrier, a specific implementation of the determining, according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

With reference to the fifth aspect or the foregoing implementation, in a seventh possible implementation of the fifth aspect, duration of the first time domain resource and the duration of the second time domain resource are equal to duration of a time domain unit of the first time domain interval.

With reference to the fifth aspect or the foregoing implementation, in an eighth possible implementation of the fifth aspect, duration of the first time domain resource and the duration of the second time domain resource are equal to any one of the following: duration of one subframe in time domain; or duration of one timeslot in time domain; or duration of two symbols in time domain; or duration of four symbols in time domain.

With reference to the fifth aspect or the foregoing implementation, in a ninth possible implementation of the fifth aspect, the duration of the second time domain resource is shorter than or equal to duration of a time domain unit of the first time domain interval.

With reference to the fifth aspect or the foregoing implementation, in a tenth possible implementation of the fifth aspect, the time domain unit of the first time domain interval is a subframe; the method further includes: sending a second parameter value, where the second parameter value is used to indicate a location of the second time domain resource in a second subframe, and the second subframe is a subframe in which the second time domain resource is located; and a specific implementation of the determining the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

With reference to the fifth aspect or the foregoing implementation, in an eleventh possible implementation of the fifth aspect, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of the determining the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

With reference to the fifth aspect or the foregoing implementation, in a twelfth possible implementation of the fifth aspect, a specific implementation of the determining the second time domain resource based on the first time domain interval and the first time domain resource is: determining a time domain resource that is after the first time domain resource and is separated from the first time domain resource by the first time domain interval, as the second time domain resource.

With reference to the fifth aspect or the foregoing implementation, in a thirteenth possible implementation of the fifth aspect, a specific implementation of the determining the second time domain resource based on the first time domain interval and the first time domain resource is: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource; or if the third time domain resource is a downlink time domain resource or an unavailable time domain resource, determining a first available uplink time domain resource after the third time domain resource as the second time domain resource.

With reference to the fifth aspect or the foregoing implementation, in a fourteenth possible implementation of the fifth aspect, a specific implementation of the sending a first parameter value is: sending indication information, where the indication information corresponds to the first parameter value; and determining the first parameter value according to the indication information; where the indication information is any one of the following: a maximum transmission timing advance TA value of the UE, a maximum transport block size TBS value of the UE, transmission mode information of the UE, capability information of the UE, or a duration type of the second time domain resource.

With reference to the fifth aspect or the foregoing implementation, in a fifteenth possible implementation of the fifth aspect, the first information is scheduling information, and the second information is uplink data information scheduled according to the scheduling information; or the first information is scheduling information, and the second information is uplink control information scheduled according to the scheduling information; or the first information is downlink control information, and the second information is feedback information about the downlink control information; or the first information is downlink data information, and the second information is acknowledgement information about the downlink data information.

According to a sixth aspect, a base station is provided, and the base station includes a sending module, a receiving module, and a processing module, where the sending module is configured to send first information, where the first information is used to instruct UE to send second information; the sending module is further configured to send a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes; the processing module is further configured to determine the second time domain resource; and the receiving module is configured to receive the second information on the second time domain resource.

With reference to the sixth aspect, in a first possible implementation, that the first parameter value is used to indicate a location relationship between a first time domain resource and a second time domain resource includes: the first parameter value is a first time domain interval between the first time domain resource and the second time domain resource.

With reference to the sixth aspect or the foregoing implementation, in a second possible implementation of the sixth aspect, a specific implementation of determining, by the processing module, the second time domain resource is: determining the second time domain resource based on the first time domain interval and the first time domain resource.

With reference to the sixth aspect or the foregoing implementation, in a third possible implementation of the sixth aspect, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

With reference to the sixth aspect or the foregoing implementation, in a fourth possible implementation of the sixth aspect, the first parameter value is an index of the mapping relationship corresponding to the first parameter value; or the first parameter value is a minimum time domain interval in the predefined mapping relationship corresponding to the first parameter value.

With reference to the sixth aspect or the foregoing implementation, in a fifth possible implementation of the sixth aspect, a specific implementation of determining, by the processing module, the second time domain resource is: determining the mapping relationship corresponding to the first parameter value; determining, according to the mapping relationship, the first time domain interval corresponding to the first time domain resource; and determining the second time domain resource based on the first time domain interval and the first time domain resource.

With reference to the sixth aspect or the foregoing implementation, in a sixth possible implementation of the sixth aspect, when a carrier used by the UE to send the second information is a TDD carrier, a specific implementation of determining, by the processing module according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

With reference to the sixth aspect or the foregoing implementation, in a seventh possible implementation of the sixth aspect, duration of the first time domain resource and the duration of the second time domain resource are equal to duration of a time domain unit of the first time domain interval.

With reference to the sixth aspect or the foregoing implementation, in an eighth possible implementation of the sixth aspect, duration of the first time domain resource and the duration of the second time domain resource are equal to any one of the following: duration of one subframe in time domain; or duration of one timeslot in time domain; or duration of two symbols in time domain; or duration of four symbols in time domain.

With reference to the sixth aspect or the foregoing implementation, in a ninth possible implementation of the sixth aspect, the duration of the second time domain resource is shorter than or equal to duration of a time domain unit of the first time domain interval.

With reference to the sixth aspect or the foregoing implementation, in a tenth possible implementation of the sixth aspect, the time domain unit of the first time domain interval is a subframe; the sending module is further configured to send a second parameter value, where the second parameter value is used to indicate a location of the second time domain resource in a second subframe, and the second subframe is a subframe in which the second time domain resource is located; and a specific implementation of determining, by the processing module, the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

With reference to the sixth aspect or the foregoing implementation, in an eleventh possible implementation of the sixth aspect, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of determining, by the processing module, the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

With reference to the sixth aspect or the foregoing implementation, in a twelfth possible implementation of the sixth aspect, a specific implementation of determining, by the processing module, the second time domain resource based on the first time domain interval and the first time domain resource is: determining a time domain resource that is after the first time domain resource and is separated from the first time domain resource by the first time domain interval, as the second time domain resource.

With reference to the sixth aspect or the foregoing implementation, in a thirteenth possible implementation of the sixth aspect, a specific implementation of determining, by the processing module, the second time domain resource based on the first time domain interval and the first time domain resource is: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource; or if the third time domain resource is a downlink time domain resource or an unavailable time domain resource, determining a first available uplink time domain resource after the third time domain resource as the second time domain resource.

With reference to the sixth aspect or the foregoing implementation, in a fourteenth possible implementation of the sixth aspect, a specific implementation of sending the first parameter value is: sending indication information, where the indication information corresponds to the first parameter value; and determining the first parameter value according to the indication information; where the indication information is any one of the following: a maximum transmission timing advance TA value of the UE, a maximum transport block size TBS value of the UE, transmission mode information of the UE, capability information of the UE, or a duration type of the second time domain resource.

With reference to the sixth aspect or the foregoing implementation, in a fifteenth possible implementation of the sixth aspect, the first information is scheduling information, and the second information is uplink data information scheduled according to the scheduling information; or the first information is scheduling information, and the second information is uplink control information scheduled according to the scheduling information; or the first information is downlink control information, and the second information is feedback information about the downlink control information; or the first information is downlink data information, and the second information is acknowledgement information about the downlink data information.

According to a seventh aspect, another user equipment is provided and includes a processor, a transmitter, and a receiver, where the processor is configured to perform the method in any one of the fifth aspect or the possible implementations of the fifth aspect by using the transmitter and the receiver.

According to an eighth aspect, a computer-readable storage medium is provided and is configured to store a computer program, where the computer program includes an instruction used to perform the method in any one of the fifth aspect or the possible implementations of the fifth aspect.

According to a ninth aspect, an information transmission method is provided, and the method includes: sending first information, where the first information is data information; obtaining a first parameter value, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes; and determining the second time domain resource based on the first parameter value, and receiving the second information on the second time domain resource.

With reference to the ninth aspect, in a first possible implementation, that the first parameter value is used to indicate a location relationship between a first time domain resource and a second time domain resource includes: the first parameter value is a first time domain interval between the first time domain resource and the second time domain resource.

With reference to the ninth aspect or the foregoing implementation, in a second possible implementation of the ninth aspect, a specific implementation of the determining the second time domain resource based on the first parameter value is: determining the second time domain resource based on the first time domain interval and the first time domain resource.

With reference to the ninth aspect or the foregoing implementation, in a third possible implementation of the ninth aspect, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

With reference to the ninth aspect or the foregoing implementation, in a fourth possible implementation of the ninth aspect, the first parameter value is an index of a mapping relationship corresponding to the first parameter value; or the first parameter value is a minimum time domain interval in a predefined mapping relationship corresponding to the first parameter value; where the mapping relationship includes a correspondence between a location of the first time domain resource and a first time domain interval, and the first time domain interval is a time domain interval between the first time domain resource and the second time domain resource.

With reference to the ninth aspect or the foregoing implementation, in a fifth possible implementation of the ninth aspect, a specific implementation of the determining the second time domain resource based on the first parameter value is: determining the mapping relationship corresponding to the first parameter value; determining, according to the mapping relationship, the first time domain interval corresponding to the first time domain resource; and determining the second time domain resource based on the first time domain interval and the first time domain resource.

With reference to the ninth aspect or the foregoing implementation, in a sixth possible implementation of the ninth aspect, when a carrier used by UE to send the second information is a TDD carrier, a specific implementation of the determining, according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

With reference to the ninth aspect or the foregoing implementation, in a seventh possible implementation of the ninth aspect, duration of the first time domain resource and the duration of the second time domain resource are equal to duration of a time domain unit of the first time domain interval.

With reference to the ninth aspect or the foregoing implementation, in an eighth possible implementation of the ninth aspect, duration of the first time domain resource and the duration of the second time domain resource are equal to any one of the following: duration of one subframe in time domain; or duration of one timeslot in time domain; or duration of two symbols in time domain; or duration of four symbols in time domain.

With reference to the ninth aspect or the foregoing implementation, in a ninth possible implementation of the ninth aspect, the duration of the second time domain resource is shorter than or equal to duration of a time domain unit of the first time domain interval.

With reference to the ninth aspect or the foregoing implementation, in a tenth possible implementation of the ninth aspect, the time domain unit of the first time domain interval is a subframe; the method further includes: obtaining a second parameter value, where the second parameter value is used to indicate a location of the second time domain resource in a second subframe, and the second subframe is a subframe in which the second time domain resource is located; and a specific implementation of the determining the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

With reference to the ninth aspect or the foregoing implementation, in an eleventh possible implementation of the ninth aspect, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of the determining the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

With reference to the ninth aspect or the foregoing implementation, in a twelfth possible implementation of the ninth aspect, a specific implementation of the determining the second time domain resource based on the first time domain interval and the first time domain resource is: determining a time domain resource that is after the first time domain resource and is separated from the first time domain resource by the first time domain interval, as the second time domain resource.

With reference to the ninth aspect or the foregoing implementation, in a thirteenth possible implementation of the ninth aspect, a specific implementation of the determining the second time domain resource based on the first time domain interval and the first time domain resource is: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource; or if the third time domain resource is a downlink time domain resource or an unavailable time domain resource, determining a first available uplink time domain resource after the third time domain resource as the second time domain resource.

With reference to the ninth aspect or the foregoing implementation, in a fourteenth possible implementation of the ninth aspect, a specific implementation of the obtaining a first parameter value is: obtaining indication information, where the indication information corresponds to the first parameter value; and determining the first parameter value according to the indication information; where the indication information is any one of the following: a maximum transmission timing advance TA value of the UE, a maximum transport block size TBS value of the UE, transmission mode information of the UE, capability information of the UE, or a duration type of the second time domain resource.

According to a tenth aspect, user equipment is provided, and the user equipment includes a sending module, a receiving module, and a processing module, where the sending module is configured to send first information, where the first information is data information; the processing module is configured to obtain a first parameter value, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes; the processing module is further configured to determine the second time domain resource based on the first parameter value; and the receiving module is configured to receive the second information on the second time domain resource.

With reference to the tenth aspect, in a first possible implementation, that the first parameter value is used to indicate a location relationship between a first time domain resource and a second time domain resource includes: the first parameter value is a first time domain interval between the first time domain resource and the second time domain resource.

With reference to the tenth aspect or the foregoing implementation, in a second possible implementation of the tenth aspect, a specific implementation of determining, by the processing module, the second time domain resource based on the first parameter value is: determining the second time domain resource based on the first time domain interval and the first time domain resource.

With reference to the tenth aspect or the foregoing implementation, in a third possible implementation of the tenth aspect, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

With reference to the tenth aspect or the foregoing implementation, in a fourth possible implementation of the tenth aspect, the first parameter value is an index of a mapping relationship corresponding to the first parameter value; or the first parameter value is a minimum time domain interval in a predefined mapping relationship corresponding to the first parameter value; where the mapping relationship includes a correspondence between a location of the first time domain resource and a first time domain interval, and the first time domain interval is a time domain interval between the first time domain resource and the second time domain resource.

With reference to the tenth aspect or the foregoing implementation, in a fifth possible implementation of the tenth aspect, a specific implementation of determining, by the processing module, the second time domain resource based on the first parameter value is: determining the mapping relationship corresponding to the first parameter value; determining, according to the mapping relationship, the first time domain interval corresponding to the first time domain resource; and determining the second time domain resource based on the first time domain interval and the first time domain resource.

With reference to the tenth aspect or the foregoing implementation, in a sixth possible implementation of the tenth aspect, when a carrier used by the UE to send the second information is a TDD carrier, a specific implementation of determining, according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

With reference to the tenth aspect or the foregoing implementation, in a seventh possible implementation of the tenth aspect, duration of the first time domain resource and the duration of the second time domain resource are equal to duration of a time domain unit of the first time domain interval.

With reference to the tenth aspect or the foregoing implementation, in an eighth possible implementation of the tenth aspect, duration of the first time domain resource and the duration of the second time domain resource are equal to any one of the following: duration of one subframe in time domain; or duration of one timeslot in time domain; or duration of two symbols in time domain; or duration of four symbols in time domain.

With reference to the tenth aspect or the foregoing implementation, in a ninth possible implementation of the tenth aspect, the duration of the second time domain resource is shorter than or equal to duration of a time domain unit of the first time domain interval.

With reference to the tenth aspect or the foregoing implementation, in a tenth possible implementation of the tenth aspect, the time domain unit of the first time domain interval is a subframe; the processing module is further configured to obtain a second parameter value, where the second parameter value is used to indicate a location of the second time domain resource in a second subframe, and the second subframe is a subframe in which the second time domain resource is located; and a specific implementation of determining, by the processing module, the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

With reference to the tenth aspect or the foregoing implementation, in an eleventh possible implementation of the tenth aspect, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of determining, by the processing module, the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

With reference to the tenth aspect or the foregoing implementation, in a twelfth possible implementation of the tenth aspect, a specific implementation of determining, by the processing module, the second time domain resource based on the first time domain interval and the first time domain resource is: determining a time domain resource that is after the first time domain resource and is separated from the first time domain resource by the first time domain interval, as the second time domain resource.

With reference to the tenth aspect or the foregoing implementation, in a thirteenth possible implementation of the tenth aspect, a specific implementation of determining, by the processing module, the second time domain resource based on the first time domain interval and the first time domain resource is: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource; or if the third time domain resource is a downlink time domain resource or an unavailable time domain resource, determining a first available uplink time domain resource after the third time domain resource as the second time domain resource.

With reference to the tenth aspect or the foregoing implementation, in a fourteenth possible implementation of the tenth aspect, a specific implementation of obtaining, by the processing module, the first parameter value is: obtaining indication information, where the indication information corresponds to the first parameter value; and determining the first parameter value according to the indication information; where the indication information is any one of the following: a maximum transmission timing advance TA value of the UE, a maximum transport block size TBS value of the UE, transmission mode information of the UE, capability information of the UE, or a duration type of the second time domain resource.

According to an eleventh aspect, another user equipment is provided and includes a processor, a transmitter, and a receiver, where the processor is configured to perform the method in any one of the ninth aspect or the possible implementations of the ninth aspect by using the transmitter and the receiver.

According to a twelfth aspect, a computer-readable storage medium is provided and is configured to store a computer program, where the computer program includes an instruction used to perform the method in any one of the ninth aspect or the possible implementations of the ninth aspect.

According to a thirteenth aspect, an information transmission method is provided, and the method includes: receiving first information, where the first information is data information; sending a first parameter value, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes; and determining the second time domain resource, and sending the second information on the second time domain resource.

With reference to the thirteenth aspect, in a first possible implementation, that the first parameter value is used to indicate a location relationship between a first time domain resource and a second time domain resource includes: the first parameter value is a first time domain interval between the first time domain resource and the second time domain resource.

With reference to the thirteenth aspect or the foregoing implementation, in a second possible implementation of the thirteenth aspect, a specific implementation of the determining the second time domain resource is: determining the second time domain resource based on the first time domain interval and the first time domain resource.

With reference to the thirteenth aspect or the foregoing implementation, in a third possible implementation of the thirteenth aspect, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

With reference to the thirteenth aspect or the foregoing implementation, in a fourth possible implementation of the thirteenth aspect, the first parameter value is an index of the mapping relationship corresponding to the first parameter value; or the first parameter value is a minimum time domain interval in the predefined mapping relationship corresponding to the first parameter value.

With reference to the thirteenth aspect or the foregoing implementation, in a fifth possible implementation of the thirteenth aspect, a specific implementation of the determining the second time domain resource is: determining the mapping relationship corresponding to the first parameter value; determining, according to the mapping relationship, the first time domain interval corresponding to the first time domain resource; and determining the second time domain resource based on the first time domain interval and the first time domain resource.

With reference to the thirteenth aspect or the foregoing implementation, in a sixth possible implementation of the thirteenth aspect, when a carrier used by UE to send the second information is a TDD carrier, a specific implementation of the determining, according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

With reference to the thirteenth aspect or the foregoing implementation, in a seventh possible implementation of the thirteenth aspect, duration of the first time domain resource and the duration of the second time domain resource are equal to duration of a time domain unit of the first time domain interval.

With reference to the thirteenth aspect or the foregoing implementation, in an eighth possible implementation of the thirteenth aspect, duration of the first time domain resource and the duration of the second time domain resource are equal to any one of the following: duration of one subframe in time domain; or duration of one timeslot in time domain; or duration of two symbols in time domain; or duration of four symbols in time domain.

With reference to the thirteenth aspect or the foregoing implementation, in a ninth possible implementation of the thirteenth aspect, the duration of the second time domain resource is shorter than or equal to duration of a time domain unit of the first time domain interval.

With reference to the thirteenth aspect or the foregoing implementation, in a tenth possible implementation of the thirteenth aspect, the time domain unit of the first time domain interval is a subframe; the method further includes: sending a second parameter value, where the second parameter value is used to indicate a location of the second time domain resource in a second subframe, and the second subframe is a subframe in which the second time domain resource is located; and a specific implementation of the determining the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

With reference to the thirteenth aspect or the foregoing implementation, in an eleventh possible implementation of the thirteenth aspect, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of the determining the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

With reference to the thirteenth aspect or the foregoing implementation, in a twelfth possible implementation of the thirteenth aspect, a specific implementation of the determining the second time domain resource based on the first time domain interval and the first time domain resource is: determining a time domain resource that is after the first time domain resource and is separated from the first time domain resource by the first time domain interval, as the second time domain resource.

With reference to the thirteenth aspect or the foregoing implementation, in a thirteenth possible implementation of the thirteenth aspect, a specific implementation of the determining the second time domain resource based on the first time domain interval and the first time domain resource is: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource; or if the third time domain resource is a downlink time domain resource or an unavailable time domain resource, determining a first available uplink time domain resource after the third time domain resource as the second time domain resource.

With reference to the thirteenth aspect or the foregoing implementation, in a fourteenth possible implementation of the thirteenth aspect, a specific implementation of the sending a first parameter value is: sending indication information, where the indication information corresponds to the first parameter value; and determining the first parameter value according to the indication information; where the indication information is any one of the following: a maximum transmission timing advance TA value of the UE, a maximum transport block size TBS value of the UE, transmission mode information of the UE, capability information of the UE, or a duration type of the second time domain resource.

According to a fourteenth aspect, a base station is provided, and the base station includes a sending module, a receiving module, and a processing module, where the receiving module is configured to receive first information, where the first information is data information; the sending module is configured to send a first parameter value, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes; the processing module is configured to determine the second time domain resource; and the sending module is configured to send the second information on the second time domain resource.

With reference to the fourteenth aspect, in a first possible implementation, that the first parameter value is used to indicate a location relationship between a first time domain resource and a second time domain resource includes: the first parameter value is a first time domain interval between the first time domain resource and the second time domain resource.

With reference to the fourteenth aspect or the foregoing implementation, in a second possible implementation of the fourteenth aspect, a specific implementation of determining, by the processing module, the second time domain resource is: determining the second time domain resource based on the first time domain interval and the first time domain resource.

With reference to the fourteenth aspect or the foregoing implementation, in a third possible implementation of the fourteenth aspect, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

With reference to the fourteenth aspect or the foregoing implementation, in a fourth possible implementation of the fourteenth aspect, the first parameter value is an index of the mapping relationship corresponding to the first parameter value; or the first parameter value is a minimum time domain interval in the predefined mapping relationship corresponding to the first parameter value.

With reference to the fourteenth aspect or the foregoing implementation, in a fifth possible implementation of the fourteenth aspect, a specific implementation of determining, by the processing module, the second time domain resource is: determining the mapping relationship corresponding to the first parameter value; determining, according to the mapping relationship, the first time domain interval corresponding to the first time domain resource; and determining the second time domain resource based on the first time domain interval and the first time domain resource.

With reference to the fourteenth aspect or the foregoing implementation, in a sixth possible implementation of the fourteenth aspect, when a carrier used by UE to send the second information is a TDD carrier, a specific implementation of determining, by the processing module according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

With reference to the fourteenth aspect or the foregoing implementation, in a seventh possible implementation of the fourteenth aspect, duration of the first time domain resource and the duration of the second time domain resource are equal to duration of a time domain unit of the first time domain interval.

With reference to the fourteenth aspect or the foregoing implementation, in an eighth possible implementation of the fourteenth aspect, duration of the first time domain resource and the duration of the second time domain resource are equal to any one of the following: duration of one subframe in time domain; or duration of one timeslot in time domain; or duration of two symbols in time domain; or duration of four symbols in time domain.

With reference to the fourteenth aspect or the foregoing implementation, in a ninth possible implementation of the fourteenth aspect, the duration of the second time domain resource is shorter than or equal to duration of a time domain unit of the first time domain interval.

With reference to the fourteenth aspect or the foregoing implementation, in a tenth possible implementation of the fourteenth aspect, the time domain unit of the first time domain interval is a subframe; the sending module is further configured to send a second parameter value, where the second parameter value is used to indicate a location of the second time domain resource in a second subframe, and the second subframe is a subframe in which the second time domain resource is located; and a specific implementation of determining, by the processing module, the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

With reference to the fourteenth aspect or the foregoing implementation, in an eleventh possible implementation of the fourteenth aspect, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of determining, by the processing module, the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

With reference to the fourteenth aspect or the foregoing implementation, in a twelfth possible implementation of the fourteenth aspect, a specific implementation of determining, by the processing module, the second time domain resource based on the first time domain interval and the first time domain resource is: determining a time domain resource that is after the first time domain resource and is separated from the first time domain resource by the first time domain interval, as the second time domain resource.

With reference to the fourteenth aspect or the foregoing implementation, in a thirteenth possible implementation of the fourteenth aspect, a specific implementation of determining, by the processing module, the second time domain resource based on the first time domain interval and the first time domain resource is: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource; or if the third time domain resource is a downlink time domain resource or an unavailable time domain resource, determining a first available uplink time domain resource after the third time domain resource as the second time domain resource.

With reference to the fourteenth aspect or the foregoing implementation, in a fourteenth possible implementation of the fourteenth aspect, a specific implementation of sending the first parameter value is: sending indication information, where the indication information corresponds to the first parameter value; and determining the first parameter value according to the indication information; where the indication information is any one of the following: a maximum transmission timing advance TA value of the UE, a maximum transport block size TBS value of the UE, transmission mode information of the UE, capability information of the UE, or a duration type of the second time domain resource.

According to a fifteenth aspect, another base station is provided and includes a processor, a transmitter, and a receiver, where the processor is configured to perform the method in any one of the thirteenth aspect or the possible implementations of the thirteenth aspect by using the transmitter and the receiver.

According to a sixteenth aspect, a computer-readable storage medium is provided and is configured to store a computer program, where the computer program includes an instruction used to perform the method in any one of the thirteenth aspect or the possible implementations of the thirteenth aspect.

According to a seventeenth aspect, an information transmission method is provided, and the method includes: receiving a configuration index, where the configuration index is used to indicate a transmission period of control information and a first time domain resource offset, and duration of a first time domain resource is shorter than one subframe; determining a time domain resource for the control information based on a system frame number and the configuration index; and sending the control information on the time domain resource.

With reference to the seventeenth aspect, in a first possible implementation, the control information includes CSI, an SR, or HARQ acknowledgement information.

With reference to the seventeenth aspect or the first possible implementation of the seventeenth aspect, in a second possible implementation, duration of a time domain unit of at least one of the transmission period and the first time domain resource offset indicated by the configuration index is the same as duration of the time domain resource in time domain.

With reference to the seventeenth aspect or the first possible implementation of the seventeenth aspect or the second possible implementation of the seventeenth aspect, in a third possible implementation, a specific implementation of the determining a time domain resource for the control information based on a system frame number and the configuration index is: determining the transmission period and the first time domain resource offset according to the configuration index; and determining the time domain resource based on the system frame number, the transmission period, the first time domain resource offset, and a second time domain resource offset; where the first time domain resource offset is an offset associated with a type of the control information, the first time domain resource offset is used to indicate an offset of the control information in the transmission period, and duration of the second time domain resource offset is equal to duration of one or more of the time domain resources, or duration of the second time domain resource offset is equal to duration of one subframe.

With reference to any one of the seventeenth aspect or the first possible implementation of the seventeenth aspect to the third possible implementation of the seventeenth aspect, in a fourth possible implementation, the second time domain resource offset is predefined; or the second time domain resource offset is sent by a base station to UE.

With reference to any one of the seventeenth aspect or the first possible implementation of the seventeenth aspect to the fourth possible implementation of the seventeenth aspect, in a fifth possible implementation, a specific implementation of the determining a time domain resource for the control information based on a system frame number and the configuration index is: determining a location of the time domain resource according to a product $M*n_f$ of a system frame number of and M, and the configuration index; or determining a location of the time domain resource according to a product $M*10*n_f$ of a system frame number of and M, and the configuration index; where M is determined according to duration of the subframe and duration of the time domain resource, and M is a positive integer.

With reference to any one of the seventeenth aspect or the first possible implementation of the seventeenth aspect to the fifth possible implementation of the seventeenth aspect, in a sixth possible implementation, a specific implementation of the determining a time domain resource for the control information based on a system frame number and the configuration index is: determining a candidate time domain resource based on the system frame number and the configuration index; and if the candidate time domain resource is an available uplink time domain resource, determining the candidate time domain resource as the time domain resource for the control information; or if the candidate time domain resource is a downlink time domain resource or an unavailable time domain resource, determining a first available uplink time domain resource after the time domain resource as the time domain resource for the control information.

According to an eighteenth aspect, user equipment is provided, and is configured to perform the method in any one of the seventeenth aspect or the possible implementations of the seventeenth aspect.

Specifically, the user equipment may include units configured to perform the method in any one of the seventeenth aspect or the possible implementations of the seventeenth aspect.

According to a nineteenth aspect, another user equipment is provided and includes a processor, a transmitter, and a receiver, where the processor is configured to perform the method in any one of the seventeenth aspect or the possible implementations of the seventeenth aspect by using the transmitter and the receiver.

According to a twentieth aspect, a computer-readable storage medium is provided and is configured to store a computer program, where the computer program includes an instruction used to perform the method in any one of the seventeenth aspect or the possible implementations of the seventeenth aspect.

According to a twenty-first aspect, an information transmission method is provided, and the method includes: receiving first information, where the first information is acknowledgement information about second information, and the second information is data information; obtaining a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes; and determining the second time domain resource based on the first parameter value.

With reference to the twenty-first aspect, in a first possible implementation, that the first parameter value is used to indicate a location relationship between a first time domain resource and a second time domain resource includes: the first parameter value is a first time domain interval between the first time domain resource and the second time domain resource.

With reference to the twenty-first aspect or the foregoing implementation, in a second possible implementation of the twenty-first aspect, a specific implementation of the determining the second time domain resource is: determining the second time domain resource based on the first time domain interval and the first time domain resource.

With reference to the twenty-first aspect or the foregoing implementation, in a third possible implementation of the twenty-first aspect, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

With reference to the twenty-first aspect or the foregoing implementation, in a fourth possible implementation of the twenty-first aspect, the first parameter value is an index of the mapping relationship corresponding to the first parameter value; or the first parameter value is a minimum time domain interval in the predefined mapping relationship corresponding to the first parameter value.

With reference to the twenty-first aspect or the foregoing implementation, in a fifth possible implementation of the twenty-first aspect, a specific implementation of the determining the second time domain resource is: determining the mapping relationship corresponding to the first parameter value; determining, according to the mapping relationship, the first time domain interval corresponding to the first time domain resource; and determining the second time domain resource based on the first time domain interval and the first time domain resource.

With reference to the twenty-first aspect or the foregoing implementation, in a sixth possible implementation of the twenty-first aspect, when a carrier used by UE to send the second information is a TDD carrier, a specific implementation of the determining, according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

With reference to the twenty-first aspect or the foregoing implementation, in a seventh possible implementation of the twenty-first aspect, duration of the first time domain resource and the duration of the second time domain resource are equal to duration of a time domain unit of the first time domain interval.

With reference to the twenty-first aspect or the foregoing implementation, in an eighth possible implementation of the twenty-first aspect, duration of the first time domain resource and the duration of the second time domain resource are equal to any one of the following: duration of one subframe in time domain; or duration of one timeslot in time domain; or duration of two symbols in time domain; or duration of four symbols in time domain.

With reference to the twenty-first aspect or the foregoing implementation, in a ninth possible implementation of the twenty-first aspect, the duration of the second time domain resource is shorter than or equal to duration of a time domain unit of the first time domain interval.

With reference to the twenty-first aspect or the foregoing implementation, in a tenth possible implementation of the twenty-first aspect, the time domain unit of the first time domain interval is a subframe; the method further includes: sending a second parameter value, where the second parameter value is used to indicate a location of the second time domain resource in a second subframe, and the second subframe is a subframe in which the second time domain resource is located; and a specific implementation of the determining the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

With reference to the twenty-first aspect or the foregoing implementation, in an eleventh possible implementation of the twenty-first aspect, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of the determining the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

With reference to the twenty-first aspect or the foregoing implementation, in a twelfth possible implementation of the twenty-first aspect, a specific implementation of the determining the second time domain resource based on the first time domain interval and the first time domain resource is: determining a time domain resource that is before the first time domain resource and is separated from the first time domain resource by the first time domain interval, as the second time domain resource.

With reference to the twenty-first aspect or the foregoing implementation, in a thirteenth possible implementation of the twenty-first aspect, a specific implementation of the obtaining the first parameter value is: sending indication information, where the indication information corresponds to the first parameter value; and determining the first parameter value according to the indication information; where the indication information is any one of the following: a maximum transmission timing advance TA value of the UE, a maximum transport block size TBS value of the UE, transmission mode information of the UE, capability information of the UE, or a duration type of the second time domain resource.

According to a twenty-second aspect, user equipment is provided, and is configured to perform the method in any one of the twenty-first aspect or the possible implementations of the twenty-first aspect.

Specifically, the user equipment may include units configured to perform the method in any one of the twenty-first aspect or the possible implementations of the twenty-first aspect.

According to a twenty-third aspect, another user equipment is provided and includes a processor, a transmitter, and a receiver, where the processor is configured to perform the method in any one of the twenty-first aspect or the possible implementations of the twenty-first aspect by using the transmitter and the receiver.

According to a twenty-fourth aspect, a computer-readable storage medium is provided and is configured to store a computer program, where the computer program includes an instruction used to perform the method in any one of the twenty-first aspect or the possible implementations of the twenty-first aspect.

According to the information transmission method, the base station, and the user equipment in the embodiments of the present invention, when a transmission delay is reduced, the second time domain resource is determined based on the first parameter value. This can shorten a time interval between the first time domain resource for receiving the first information and the second time domain resource for sending the second information, so that an interval for sending data or feeding back control information is shorter. Therefore, performance gains of delay reduction can be obtained, transmission efficiency and a network throughput are improved, and transmission efficiency of a communications system is improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM), a Code Division Multiple Access (CDMA) system, a Wideband Code Division Multiple Access (WCDMA) system, a general packet radio service (GPRS) system, and an Long Term Evolution (LTE) system.

User equipment (UE) may also be referred to as a mobile terminal, an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN).

A network device may be a device used to communicate with a mobile device; and the network device may be a base transceiver station (BTS) in GSM or CDMA; or may be an NB (NodeB) in WCDMA; or may be an evolved NodeB (eNB) in LTE, an access point, an in-vehicle device, a wearable device, a network device in a future 5G network, a network device in a future evolved PLMN, or the like.

A system to which the present invention is applicable may be an frequency division duplex (FDD) system, a time division duplex (TDD) system, or a system in which two duplex modes FDD and TDD are integrated for use. This is not limited in the present invention.

Figure 1:
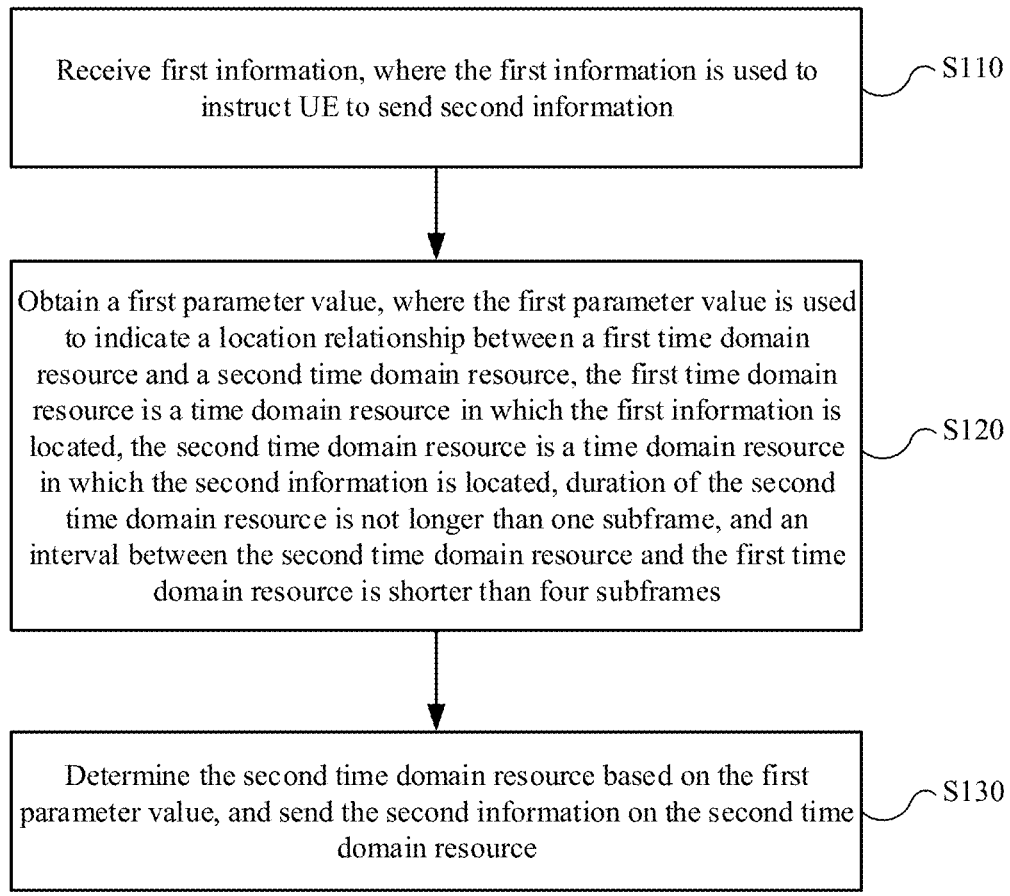
FIG. 1 is a schematic diagram of an information transmission method according to an embodiment of the present invention.

FIG. 1 is a schematic diagram of an information transmission method according to an embodiment of the present invention. The method in FIG. 1 is performed by user equipment.

S110. Receive first information, where the first information is used to instruct UE to send second information.

S120. Obtain a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes.

It should be understood that, the first time domain resource mentioned in the present invention is the time domain resource in which the first information is located, and resources occupied for transmitting the first information may include all or some frequency domain resources, code domain resources, and space domain resources on the first time domain resource. Likewise, the second time domain resource mentioned in the present invention is the time domain resource in which the second information is located, and resources occupied for transmitting the second information may include all or some frequency domain resources, code domain resources, and space domain resources on the second time domain resource. It should be understood that, the first parameter value obtained by the UE is used to indicate information about a time domain resource. Further, the UE may obtain information about a specific frequency domain resource, a code domain resource, a space domain resource, and the like on the time domain resource. This is not limited in this embodiment of the present invention.

It should be understood that, one subframe mentioned in this embodiment of the present invention is a unit of a physical resource that occupies specific transmission duration, and duration of the subframe is predefined. One subframe may include two or more timeslots (slot), or include a plurality of symbols, for example, 10 symbols, or 14 symbols. Duration of one subframe may be 1 ms, or 0.5 ms, or 0.125 ms, or the like. A specific value is not limited in the present invention. When duration of one subframe is shortened, duration of timeslots or symbols in the subframe is also correspondingly shortened in proportion. For example, one subframe includes two timeslots, and duration of a timeslot in a 0.5 ms subframe is ½ duration of a timeslot in a 1 ms subframe.

It should be understood that, the first parameter value obtained by the UE may be sent by a network device such as a base station to the UE, or specified by a protocol.

It should be understood that, there is no strict time sequence between step S110 and step S120. Step S120 may be performed before step S110, or after step S110, or simultaneously with step S110. This is not limited herein in this embodiment of the present invention. Particularly, the first information and the first parameter value may be transmitted by using a same message. To be specific, the message received by the UE and including the first information may further include the first parameter value.

It should be understood that, the first parameter value obtained by the UE is used to indicate information about a time domain resource. Further, the UE may obtain information about a specific frequency domain resource, a code domain resource, a space domain resource, and the like on the time domain resource. This is not limited in this embodiment of the present invention.

S130. Determine the second time domain resource based on the first parameter value, and send the second information on the second time domain resource.

In this embodiment of the present invention, when a transmission delay is reduced, the UE determines the second time domain resource based on the first parameter value. This can shorten a time interval between the first time domain resource for receiving the first information and the second time domain resource for sending the second information, so that an interval for sending data or feeding back control information is shorter. Therefore, performance gains of delay reduction can be obtained, transmission efficiency and a network throughput are improved, and transmission efficiency of a communications system is improved.

Optionally, in an embodiment, the first information is scheduling information, and the second information is uplink data information scheduled according to the scheduling information. In this embodiment of the present invention, the UE may shorten an interval between the scheduling information and uplink data to improve uplink data transmission efficiency and the network throughput.

Alternatively, optionally, in an embodiment, the first information is scheduling information, and the second information is uplink control information scheduled according to the scheduling information. For example, the control information is aperiodic CSI, and the scheduling information is CSI trigger information.

Alternatively, optionally, in an embodiment, the first information is downlink control information, and the second information is feedback information about the downlink control information. In this embodiment of the present invention, the UE may shorten a transmission interval between the downlink control information and the feedback information to improve uplink control information feedback efficiency.

Alternatively, optionally, in an embodiment, the first information is downlink data information, and the second information is acknowledgement information about the downlink data information. It should be understood that, herein the acknowledgement information may include positive acknowledgement information (ACK) or negative acknowledgement (NACK) information. In this embodiment of the present invention, the UE may shorten a transmission interval between the downlink data information and the acknowledgement information to improve acknowledgement information feedback efficiency.

It should be understood that, the first parameter value may indicate the location relationship between the first time domain resource and the second time domain resource in a plurality of manners.

Optionally, in an embodiment, that the first parameter value is used to indicate a location relationship between a first time domain resource and a second time domain resource includes: the first parameter value is a first time domain interval between the first time domain resource and the second time domain resource.

It should be understood that, if both duration of the first time domain resource and the duration of the second time domain resource are equal to a duration unit of the first time domain interval, the first time domain interval is equal to a time domain interval between the first time domain resource and the second time domain resource; or if duration of the first time domain resource or the duration of the second time domain resource is not equal to a duration unit of the first time domain interval, the first time domain interval indicates an interval between a time domain unit of the first time domain resource and a time domain unit of the second time domain resource, where duration of the time domain unit is not shorter than the duration of the first time domain resource or the duration of the second time domain resource.

It should be understood that, in this embodiment of the present invention, unit duration of the first parameter value may be duration of one subframe, duration of one timeslot, duration of two symbols, duration of four symbols, or the like.

For example, the base station may send the first parameter value to the UE, where the value is 2, and a unit is a subframe; in this case, it indicates that a time domain interval between a subframe in which the first time domain resource is located and a subframe in which the second time domain resource is located is two subframes.

Further, in a possible implementation of this embodiment, a specific implementation of the determining the second time domain resource based on the first parameter value may be: determining the second time domain resource based on the first time domain interval and the first time domain resource.

For example, assuming that the first time domain resource is a subframe n, and the first time domain interval is k, indicating k subframes, a subframe n+k may be determined as the second time domain resource. When a subcarrier for sending the second information is an FDD subcarrier, generally the UE uses this manner.

In this embodiment of the present invention, the first time domain interval between the first time domain resource and the second time domain resource is determined based on the first parameter value, and further, the second time domain resource is determined based on the first time domain resource and the first time domain interval. Therefore, an interval for sending data or feeding back control information is shorter, performance gains of delay reduction can be obtained, and transmission efficiency and the network throughput are improved.

Alternatively, optionally, a specific implementation of the determining the second time domain resource based on the first time domain interval and the first time domain resource may be: determining a third time domain resource based on the first time domain interval and the first time domain resource; and if the third time domain resource is an available uplink time domain resource, determining the third time domain resource as the second time domain resource. Specifically, for example, the third time domain resource may be a time domain resource that is after the first time domain resource and is separated from the first time domain resource by the first time domain interval.

In this embodiment of the present invention, after the third time domain resource is determined based on the first time domain interval and the first time domain resource, whether the third time domain resource is an available uplink time domain resource is determined, and when the third time domain resource is an available uplink time domain resource, the third time domain resource is determined as the second time domain resource. Therefore, the UE is prevented from sending the second information on a downlink time domain resource or an unavailable time domain resource.

Table 1 shows transmission periods and frame structures in different TDD uplink-downlink configurations, where D represents a downlink subframe, U represents an uplink subframe, and S represents a special subframe.

TABLE 1

| TDD UL-DL Configuration | Period | Subframe 0 | Subframe 1 | Subframe 2 | Subframe 3 | Subframe 4 | Subframe 5 | Subframe 6 | Subframe 7 | Subframe 8 | Subframe 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It should be understood that, the determining the second time domain resource based on the first time domain interval and the first time domain resource may include a plurality of implementations.

Optionally, a specific implementation of the determining the second time domain resource based on the first time domain interval and the first time domain resource may be: determining a time domain resource that is after the first time domain resource and is separated from the first time domain resource by the first time domain interval, as the second time domain resource.

Using Table 1 as an example, assuming that a frequency domain resource used by the UE to send the second information is a TDD subcarrier, and a TDD uplink-downlink configuration of the UE is 1, and a value of the subframe n of the first time domain resource is 4, and a value of the first time domain interval k is three subframes, the UE may determine the subframe n+k as the third time domain resource, that is, determine a subframe 7 as the third time domain resource. Because the subframe 7 is an available uplink subframe, the UE may send the second information in the subframe 7.

Alternatively, optionally, a specific implementation of the determining the second time domain resource based on the first time domain interval and the first time domain resource may be: determining a third time domain resource, where the third time domain resource is a time domain resource that is after the first time domain resource and is separated from the first time domain resource by the first time domain interval; and if the third time domain resource is a downlink time domain resource or an unavailable time domain resource, determining a first available uplink time domain resource after the third time domain resource as the second time domain resource.

Still using Table 1 as an example, assuming that a TDD uplink-downlink configuration of the UE is 1, and a value of the subframe n of the first time domain resource is 4, and a value of a subframe interval k is 2, it may be determined that the subframe n+k is a subframe 6; and further, it may be determined that the subframe 6 is a special subframe. The UE may select a first available uplink subframe after the subframe 6 as the second time domain resource, that is, select a subframe 7 as the second time domain resource, and send the second information in the subframe 7.

Certainly, it should be understood that, if the third time domain resource is a downlink time domain resource or an unavailable time domain resource, the UE may also select not to send the second information. Still using Table 1 as an example, assuming that a TDD uplink-downlink configuration of the UE is 1, and a value of the subframe n of the first time domain resource is 4, and a value of a subframe interval k is 2, the UE may determine a subframe 6, and after determining that the subframe 6 is not an available uplink subframe, abandon sending the second information.

Certainly, it should be understood that, the duration unit of the first time domain interval may also be one timeslot, or two symbols, or four symbols, or the like.

Assuming that a system frame is divided into 20 timeslots, a frame structure of a TDD system frame divided into 20 timeslots may be shown in Table 2.

interval is 2, the UE may first determine timeslot 1+2=timeslot 3. Because a subframe in which the timeslot 3 is located is a special subframe and cannot be used to send uplink data, the UE may determine a first timeslot of a first available uplink subframe after the timeslot 3 as the second time domain resource. Specifically, the UE may determine a timeslot 4 as the second time domain resource.

Optionally, in another embodiment, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

Specifically, in this embodiment, a specific implementation of the determining the second time domain resource based on the first parameter value may be: determining the mapping relationship corresponding to the first parameter value; determining, according to the mapping relationship, the first time domain interval corresponding to the first time domain resource; and determining the second time domain resource based on the first time domain interval and the first time domain resource.

In this embodiment of the present invention, the predefined mapping relationship is determined based on the first parameter value, then the first time domain interval between the first time domain resource and the second time domain resource is determined according to the predefined mapping relationship, and further, the second time domain resource is determined based on the first time domain resource and the first time domain interval. Therefore, an interval for sending

TABLE 2

| TDD UL-DL Configuration | Period | Slot 0 | Slot 1 | Slot 2 | Slot 3 | Slot 4 | Slot 5 | Slot 6 | Slot 7 | Slot 8 | Slot 9 |
|---|---|---|---|---|---|---|---|---|---|---|---|
| 0 | 5 ms | D | D | S | S | U | U | U | U | U | U |
| 1 | 5 ms | D | D | S | S | U | U | U | U | D | D |
| 2 | 5 ms | D | D | S | S | U | U | D | D | D | D |
| 3 | 10 ms | D | D | S | S | U | U | U | U | U | U |
| 4 | 10 ms | D | D | S | S | U | U | U | U | D | D |
| 5 | 10 ms | D | D | S | S | U | U | D | D | D | D |
| 6 | 5 ms | D | D | S | S | U | U | U | U | U | U |

| TDD UL-DL Configuration | Slot 10 | Slot 11 | Slot 12 | Slot 13 | Slot 14 | Slot 15 | Slot 16 | Slot 17 | Slot 18 | Slot 19 |
|---|---|---|---|---|---|---|---|---|---|---|
| 0 | D | D | S | S | U | U | U | U | U | U |
| 1 | D | D | S | S | U | U | U | U | D | D |
| 2 | D | D | S | S | U | U | D | D | D | D |
| 3 | D | D | D | D | D | D | D | D | D | D |
| 4 | D | D | D | D | D | D | D | D | D | D |
| 5 | D | D | D | D | D | D | D | D | D | D |
| 6 | D | D | S | S | U | U | U | D | D | D | where D indicates that the timeslot is used to send downlink data, U indicates that the timeslot is used to send uplink data, and S indicates that the timeslot is a special timeslot.

Using Table 2 as an example, assuming that the UE uses a TDD uplink-downlink configuration 2, and a timeslot number of the first time domain resource is 1, and a timeslot data or feeding back control information is shorter, performance gains of delay reduction can be obtained, and transmission efficiency and the network throughput are improved.

A definition of the first time domain interval in this embodiment of the present invention is similar to a definition of the first time domain interval in the foregoing embodiment in which the first parameter value is the first time domain interval. Details are not described again herein in this embodiment of the present invention.

Further, when a carrier used by the UE to send the second information is a TDD carrier, the determining, according to the mapping relationship, the first time domain interval corresponding to the first time domain resource is: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

It should be understood that, the predefined mapping relationship may be a mapping relationship table specified by the protocol, or the like. Table 3, Table 4, and Table 5 respectively show a possible mapping relationship table of TDD, where a unit of measurement of a time domain interval in the mapping relationship table is a subframe.

TABLE 3

| TDD UL-DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 3 | 3 | | | 3 | 3 | | | | |
| 1 | 3 | | | | 3 | 3 | | | | 3 |
| 2 | | | | | 3 | | | | | 3 |
| 3 | 3 | 3 | | | | | | | | 3 |
| 4 | 3 | | | | | | | | | 3 |
| 5 | | | | | | | | | | 3 |
| 6 | 7 | 7 | | | 7 | 7 | | | | 5 |

TABLE 4

| TDD UL-DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 2 | 2 | | | 2 | 2 | | | |
| 1 | | | 2 | | 3 | | 2 | | | 3 |
| 2 | 2 | | | | 2 | | | | | |
| 3 | | 2 | 2 | | | | | | | 5 |
| 4 | | 2 | 2 | | | | | | | |
| 5 | | 2 | | | | | | | | |
| 6 | | 2 | 2 | | | | 2 | 2 | | 5 |

TABLE 5

| TDD UL-DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 3 | 1 | | | 3 | 1 | | | | |
| 1 | | 1 | | | 4 | 1 | | | | 4 |
| 2 | | 1 | | | | 1 | | | | |
| 3 | 3 | 1 | | | | | | | | 5 |
| 4 | 3 | 1 | | | | | | | | |
| 5 | | 1 | | | | | | | | |
| 6 | 3 | 1 | | | 3 | 1 | | | | 5 |

In the foregoing Table 3 to Table 5, a second row indicates a subframe number, and a first column indicates different TDD uplink-downlink configurations. A row in the table indicates a subframe interval corresponding to each subframe in a corresponding TDD uplink-downlink configuration.

For example, in Table 3, when a TDD uplink-downlink configuration of a TDD carrier of the UE is 1, and the subframe of the first time domain resource is 4, a subframe interval corresponding to the first time domain resource is 3. For another example, in Table 5, when a TDD uplink-downlink configuration of a TDD carrier of the UE is 2, and the subframe of the first time domain resource is 1, a subframe interval corresponding to the first time domain resource is 1.

Certainly, it should be understood that, in this embodiment of the present invention, the mapping relationship may be indicated in a plurality of manners.

Optionally, in a possible implementation of this embodiment, the first parameter value may be an index of a mapping relationship corresponding to the first parameter value. Using mapping relationship tables shown in the foregoing Table 3 to Table 5 as an example, assuming that indexes of the mapping relationship tables shown in Table 3 to Table 5 are 1, 2, and 3 respectively, when the first parameter value carried in first information is 1, it indicates that the mapping relationship table shown in Table 3 is selected.

Optionally, in another possible implementation of this embodiment, the first parameter value is a minimum time domain interval in a predefined mapping relationship corresponding to the first parameter value. One minimum time domain interval corresponds to one predefined mapping relationship, and minimum time domain intervals in different mapping relationships are different. Still using the mapping relationship tables shown in the foregoing Table 3 to Table 5 as an example, the first parameter value is 1, indicating that the mapping relationship corresponding to the first parameter value is the mapping relationship table shown in Table 5.

It should be understood that, configurations of the foregoing Table 3 to Table 5 are merely examples. In an actual application, other configuration modes may exist. For example, when the minimum time domain interval in the mapping relationship table is 2, the mapping relationship table may be further shown in Table 6.

TABLE 6

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 2 | 2 | | | 2 | 2 | | | | |
| 1 | | 2 | | 3 | | 2 | | | | 3 |
| 2 | 2 | | | | 2 | | | | | |
| 3 | 2 | 2 | | | | | | | | 5 |
| 4 | 2 | 2 | | | | | | | | |
| 5 | 2 | | | | | | | | | |
| 6 | 2 | 2 | | | | | 2 | 2 | | 5 |

Optionally, in an embodiment, the duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

In this embodiment, because the duration of the second time domain resource is shorter than the duration of the time domain unit of the first time domain interval, the second time domain resource cannot be determined completely based on the first time domain interval and the first time domain resource, and a location of the second time domain resource in the time domain unit of the second time domain resource also needs to be indicated, where the time domain unit is the time domain unit of the first time domain interval.

Optionally, in a possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located.

Specifically, when the time domain unit of the first time domain interval is a subframe, and the duration of the first time domain resource and the duration of the second time domain resource are one timeslot (slot), a relationship between a location index of the first time domain resource in a first time domain unit and a location index of a second time domain resource in the second time domain unit may be one of the following:

when the first time domain resource uses an odd timeslot of the first subframe, the second time domain resource uses an odd timeslot of the second subframe; or when the first time domain resource uses an odd timeslot of the first subframe, the second time domain resource uses an even timeslot of the second subframe; or when the first time domain resource uses an even timeslot of the first subframe, the second time domain resource uses an odd timeslot of the second subframe; or when the first time domain resource uses an even timeslot of the first subframe, the second time domain resource uses an even timeslot of the second subframe;

where the first subframe is the subframe in which the first time domain resource is located, and the second subframe is the subframe in which the second time domain resource is located.

In this case, a specific implementation of the determining the second time domain resource based on the first time domain interval and the first time domain resource may be: determining the second subframe based on the first time domain interval and the first subframe; and determining the location of the second time domain resource in the second subframe according to the relationship between the location of the first time domain resource in the first subframe and the location of the second time domain resource in the second subframe.

Figure 2:
FIG. 2 is a schematic diagram of a timeslot relationship between a first time domain resource and a second time domain resource according to an embodiment of the present invention.

FIG. 2 is a schematic diagram of a timeslot relationship between a first time domain resource and a second time domain resource according to an embodiment of the present invention. For example, assume that it is pre-agreed that when the first time domain resource uses an odd timeslot of the first subframe, the second time domain resource uses an odd timeslot of the second subframe. In a scenario shown in the FIG. 2, the UE obtains scheduling information in an odd timeslot of the subframe n by using a UL grant, and a subframe interval is k subframes. To be specific, the first time domain resource of the UE is an odd timeslot of the subframe n, and the first time domain interval is k. In this case, the UE may determine the subframe n+k based on the first time domain resource and the first time domain interval, and determine a timeslot location of the second time domain resource in the subframe n+k according to the relationship between the location of the first time domain resource in the first subframe and the location of the second time domain resource in the second subframe, that is, determine an odd timeslot of the subframe n+k as the second time domain resource.

Optionally, locations of symbols or the like used by the second time domain resource and the first time domain resource in the subframes may also be specified. For example, it may be specified that the second time domain resource and the first time domain resource use a symbol 0 and a symbol 1 in the subframes. For example, specifically, when the time domain unit of the first time domain interval is a subframe, and the duration of the first time domain resource and the duration of the second time domain resource are two symbols, the location index of the first time domain resource in the first time domain unit and the location index of the second time domain resource in the second time domain unit may be the same or different in the subframes.

In this embodiment of the present invention, when the time domain unit of the first time domain interval is a subframe, and the duration of the second time domain resource is shorter than duration of one subframe, the location of the second time domain resource in the subframe in which the second time domain resource is located is specified in advance, so that the UE can accurately determine the location of the second time domain resource.

Optionally, in another possible implementation of this embodiment, the time domain unit of the first time domain interval is a subframe; and the method further includes: obtaining a second parameter value, where the second parameter value is used to indicate a location of the second time domain resource in a second subframe, and the second subframe is a subframe in which the second time domain resource is located.

In this case, a specific implementation of the determining the second time domain resource based on the first time domain interval and the first time domain resource may be: determining the second subframe based on the first time domain interval and a first subframe, where the first subframe is a subframe in which the first time domain resource is located; and determining the location of the second time domain resource in the second subframe based on the second parameter value.

Still using the scenario shown in FIG. 2 as an example, if the subframe in which the first time domain resource is located is the subframe n, assuming that the first parameter value obtained by the UE indicates that the first time domain interval is k, and that a value of the second parameter value obtained by the UE is 0, indicating an odd timeslot, the UE may first determine, based on the first time domain resource and the first time domain interval, the subframe n+k as the subframe in which the second time domain resource is located, and then determine, based on the second parameter value, an odd timeslot in the subframe n+k as the second time domain resource.

It should be understood that, the first parameter value may be sent by the base station or specified by the protocol.

When the first parameter value is sent by the base station, the base station may directly send the first parameter value, or implicitly indicate the first parameter value by using other information.

When the base station implicitly indicates the first parameter value by using other information, optionally, a specific implementation of the obtaining a first parameter value may be:

obtaining indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

For example, the protocol may define a maximum supported TA value. Different TA values correspond to different first parameter values. The UE determines the first parameter value by using a maximum TA value sent by the base station. For example, there are four different TA values, corresponding to four different first parameter values. Generally, if a TA value is greater, a first parameter value corresponding to the TA value is also greater. Alternatively, for example, there are M TA values and N first parameter values, where both M and N are non-zero integers, and M<N. To be specific, one TA value may correspond to one or more first parameter values.

It should be understood that, in this embodiment of the present invention, the TA value may be obtained by using signaling sent by the base station, where the signaling may be sent by using a broadcast message or a multicast message.

For another example, the protocol may define a maximum supported TBS value, and different TBS values correspond to different first parameter values. The UE determines the first parameter value by using a maximum TBS value sent by the base station. Similar to the TA value, one TBS value corresponds to only one first parameter value, or one TBS value corresponds to one or more first parameter values.

For another example, a transmission mode may be a mode 0, a mode 1, a mode 2, or a mode 3, and different transmission modes correspond to different first parameter values. Herein the transmission mode may be any one of the following: different multi-antenna transmission modes (for example, single-antenna or multi-antenna, transmit diversity or spatial multiplexing, single-user Multiple Input Multiple Output (MIMO) or multi-user MIMO, and single-stream or multi-stream); whether a coordinated transmission mode (coordinated multipoint transmission mode or non-coordinated transmission mode) is used; and transmission modes corresponding to different transmission duration (for example, a transmission mode corresponding to 1 ms duration, a transmission mode corresponding to one timeslot, a transmission mode corresponding to two symbols, or a transmission mode corresponding to four symbols). The UE determines the first parameter value by using transmission mode information sent by the base station. Similar to the TA value, one transmission mode corresponds to only one first parameter value, or one transmission mode corresponds to one or more first parameter values. For example, for transmission modes of different transmission duration, a first parameter value for the transmission mode of 1 ms duration may be 3 or 4; and a first parameter value for the transmission mode of 2-symbol duration may be 4 to 8. When a transmission mode corresponds a plurality of first parameter values that are not unique, the first parameter value may be further determined by using other information. The information is used to indicate a specific value of a corresponding first parameter during each transmission. The information may be predefined or indicated by the base station.

For another example, different capability information of the UE corresponds to different first parameter values, and the UE determines the first parameter value according to the capability information of the UE. If a processing capability of the UE is higher, a corresponding first parameter value may be smaller, and it indicates that the UE can complete sending processing or receiving processing of a service within a shorter time.

For another example, the UE may determine the first parameter value according to the duration type of the second time domain resource. For example, a first parameter value corresponding to 1 ms duration is 3; and a first parameter value corresponding to 0.5 ms duration is 2.

In this embodiment of the present invention, because the first parameter value is indicated implicitly, signaling of indication can be reduced. In addition, because the first parameter value is indicated implicitly, key parameters for reducing a transmission delay can be further associated. This ensures consistency of the key parameters during system communication, and reduces a potential conflict caused by inconsistency of configured parameters.

Figure 3:
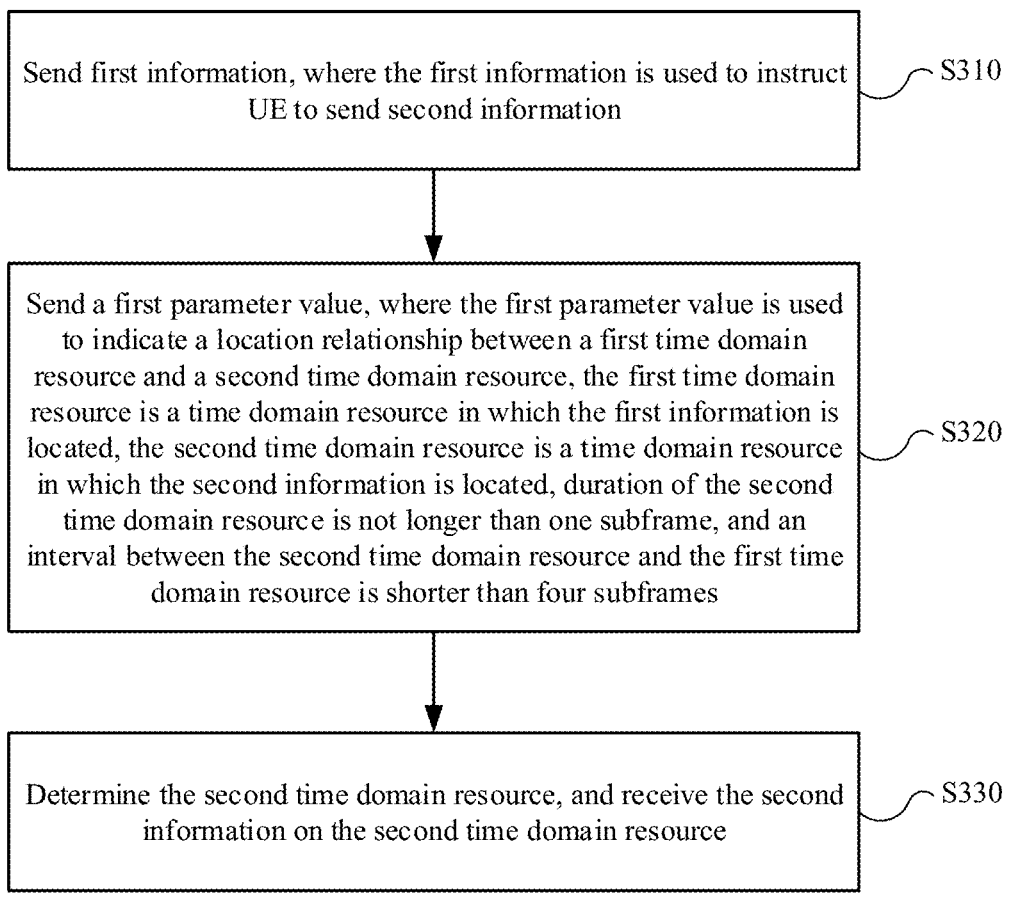
FIG. 3 is a schematic diagram of an information transmission method according to another embodiment of the present invention.

FIG. 3 is a schematic diagram of an information transmission method according to another embodiment of the present invention. The method in FIG. 3 is performed by a network device, for example, a base station, or is performed by a D2D device. The method includes the following steps.

S310. Send first information, where the first information is used to instruct UE to send second information.

S320. Send a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes.

It should be understood that, the first time domain resource mentioned in the present invention is the time domain resource in which the first information is located, and resources occupied for transmitting the first information may include all or some frequency domain resources, code domain resources, and space domain resources on the first time domain resource. Likewise, the second time domain resource mentioned in the present invention is the time domain resource in which the second information is located, and resources occupied for transmitting the second information may include all or some frequency domain resources, code domain resources, and space domain resources on the second time domain resource. It should be understood that, the first parameter value sent by a base station is used to indicate information about a time domain resource. Further, the base station may send information about a specific frequency domain resource, a code domain resource, a space domain resource, and the like on the time domain resource to the UE. This is not limited in this embodiment of the present invention.

It should be understood that, one subframe mentioned in this embodiment of the present invention is a unit of a physical resource that occupies specific transmission duration, and duration of the subframe is predefined. One subframe may include two or more timeslots (slot), or include a plurality of symbols, for example, 10 symbols, or 14 symbols. Duration of one subframe may be 1 ms, or 0.5 ms, or 0.125 ms, or the like. A specific value is not limited in the present invention. When duration of one subframe is shortened, duration of timeslots or symbols in the subframe is also correspondingly shortened in proportion. For example, one subframe includes two timeslots, and duration of a timeslot in a 0.5 ms subframe is ½ duration of a timeslot in a 1 ms subframe.

It should be understood that, there is no strict time sequence between step S310 and step S320. Step S320 may be performed before step S310, or after step S310, or simultaneously with step S310. This is not limited herein in this embodiment of the present invention. For example, the first parameter value may be transmitted together with the first information in a same message, or transmitted before the first information, or transmitted after the first information.

S330. Determine the second time domain resource, and receive the second information on the second time domain resource.

In this embodiment of the present invention, when a transmission delay is reduced, the base station sends the first parameter value to the UE, so that the UE determines the second time domain resource based on the first parameter value. This can shorten a time interval between the first time domain resource for sending the first information and the second time domain resource for receiving the second information, so that an interval for receiving data or receiving control information of feedback is shorter. Therefore, performance gains of delay reduction can be obtained, transmission efficiency and a network throughput are improved, and transmission efficiency of a communications system is improved.

Optionally, in an embodiment, the first information is scheduling information, and the second information is uplink data information scheduled according to the scheduling information. In this embodiment of the present invention, the base station sends a first parameter value to the UE, so that the UE can shorten a transmission interval between the scheduling information and uplink data according to the first reference value to improve uplink data transmission efficiency and the network throughput.

Alternatively, optionally, in an embodiment, the first information is scheduling information, and the second information is uplink control information scheduled according to the scheduling information. For example, the control information is aperiodic CSI, and the scheduling information is CSI trigger information.

Alternatively, optionally, in an embodiment, the first information is downlink control information, and the second information is feedback information about the downlink control information. In this embodiment of the present invention, the base station sends the first reference value to the UE, so that the UE can shorten a transmission interval between the downlink control information and the feedback information according to the first reference value to improve uplink control information feedback efficiency.

Alternatively, optionally, in an embodiment, the first information is downlink data information, and the second information is acknowledgement information about the downlink data information. It should be understood that herein the acknowledgement information may include ACK information or NACK information. In this embodiment of the present invention, the base station sends the first reference value to the UE, so that the UE can shorten a transmission interval between the downlink data information and the acknowledgement information according to the first reference value to improve acknowledgement information feedback efficiency.

Optionally, in an embodiment, that the first parameter value is used to indicate a location relationship between a first time domain resource and a second time domain resource includes: the first parameter value is a first time domain interval between the first time domain resource and the second time domain resource.

Further, in a possible implementation of this embodiment, a specific implementation of the determining the second time domain resource based on the first parameter value may be: determining the second time domain resource based on the first time domain interval and the first time domain resource.

It should be understood that, in this embodiment of the present invention, for a specific implementation in which the first parameter value is the first time domain interval between the first time domain resource and the second time domain resource, reference may be made to descriptions about the embodiment shown in FIG. 1.

Optionally, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource. Specifically, the first parameter value is an index of the mapping relationship corresponding to the first parameter value; or the first parameter value is a minimum time domain interval in the predefined mapping relationship corresponding to the first parameter value.

Further, a specific implementation of the determining the second time domain resource may be: determining the mapping relationship corresponding to the first parameter value; determining, according to the mapping relationship, the first time domain interval corresponding to the first time domain resource; and determining the second time domain resource based on the first time domain interval and the first time domain resource.

Still further, when a carrier used by the UE to send the second information is a TDD carrier, a specific implementation of the determining, according to the mapping relationship, the first time domain interval corresponding to the first time domain resource may be: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

It should be understood that, in this embodiment of the present invention, for a specific implementation in which the first parameter value corresponds to a predefined mapping relationship, reference may be made to descriptions about the embodiment shown in FIG. 1. Details are not described again herein in this embodiment of the present invention.

Optionally, a specific implementation of the determining the second time domain resource based on the first time domain interval and the first time domain resource may be: determining a time domain resource that is after the first time domain resource and is separated from the first time domain resource by the first time domain interval, as the second time domain resource.

Alternatively, optionally, a specific implementation of the determining the second time domain resource based on the first time domain interval and the first time domain resource may be: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource.

Alternatively, optionally, a specific implementation of the determining the second time domain resource based on the first time domain interval and the first time domain resource may be: if the third time domain resource is a downlink time domain resource or an unavailable time domain resource, determining a first available uplink time domain resource after the third time domain resource as the second time domain resource.

Optionally, in an embodiment, duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

Optionally, in an implementation of this embodiment, the time domain unit of the first time domain interval is a subframe; and before the determining the second time domain resource based on the first time domain interval and the first time domain resource, the method further includes: sending a second parameter value, where the second parameter value is used to indicate a location of the second time domain resource in a second subframe, and the second subframe is a subframe in which the second time domain resource is located; and the determining the second time domain resource based on the first time domain interval and the first time domain resource includes: determining the second subframe based on the first time domain interval and a first subframe, where the first subframe is a subframe in which the first time domain resource is located; and determining the location of the second time domain resource in the second subframe based on the second parameter value.

Optionally, in another possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of the determining the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

It should be understood that, in this embodiment of the present invention, for a specific implementation of the determining the second time domain resource based on the first time domain interval and the first time domain resource, reference may be made to descriptions about the embodiment shown in FIG. 1. Details are not described again herein in this embodiment of the present invention.

It should be understood that, the base station may send the first parameter value in a plurality of manners.

Optionally, in an embodiment, a specific implementation of the sending a first parameter value may be: sending indication information, where the indication information carries the first parameter value. The indication information may be sent together with the first information, or sent before the first information, or sent after the first information. This is not limited herein in this embodiment of the present invention.

Alternatively, optionally, a specific implementation of the sending a first parameter value may be: sending indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

It should be understood that, in this embodiment of the present invention, for a specific implementation of the first parameter value sent by the base station, reference may be made to the implementation of the first parameter value obtained by the UE in the embodiment shown in FIG. 1. Details are not described again herein in this embodiment of the present invention.

Figure 4:
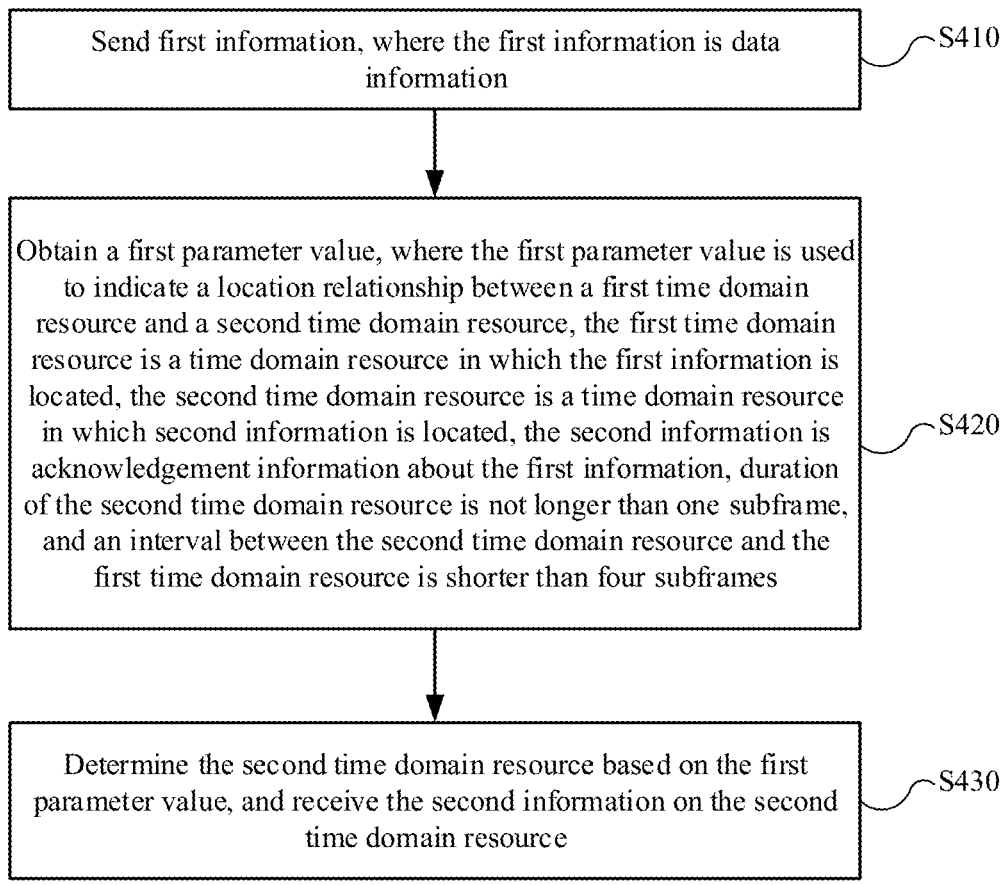
FIG. 4 is a schematic diagram of an information transmission method according to still another embodiment of the present invention.

FIG. 4 is a schematic diagram of an information transmission method according to still another embodiment of the present invention. The method in FIG. 4 is performed by user equipment. The method includes the following steps.

S410. Send first information, where the first information is data information.

S420. Obtain a first parameter value, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes.

It should be understood that, the first time domain resource mentioned in the present invention is the time domain resource in which the first information is located, and resources occupied for transmitting the first information may include all or some frequency domain resources, code domain resources, and space domain resources on the first time domain resource. Likewise, the second time domain resource mentioned in the present invention is the time domain resource in which the second information is located, and resources occupied for transmitting the second information may include all or some frequency domain resources, code domain resources, and space domain resources on the second time domain resource. It should be understood that, the first parameter value is used to indicate information about a time domain resource. Further, UE may obtain information about a specific frequency domain resource, a code domain resource, a space domain resource, and the like on the time domain resource. This is not limited in this embodiment of the present invention.

It should be understood that, one subframe mentioned in this embodiment of the present invention is a unit of a physical resource that occupies specific transmission duration, and duration of the subframe is predefined. One subframe may include two or more timeslots (slot), or include a plurality of symbols, for example, 10 symbols, or 14 symbols. Duration of one subframe may be 1 ms, or 0.5 ms, or 0.125 ms, or the like. A specific value is not limited in the present invention. When duration of one subframe is shortened, duration of timeslots or symbols in the subframe is also correspondingly shortened in proportion. For example, one subframe includes two timeslots, and duration of a timeslot in a 0.5 ms subframe is ½ duration of a timeslot in a 1 ms subframe.

It should be understood that, the first parameter value obtained by the UE may be sent by a network device such as a base station to the UE, or specified by a protocol.

It should be understood that, there is no strict time sequence between step S410 and step S420. Step S420 may be performed before step S410, or after step S410, or simultaneously with step S410. This is not limited herein in this embodiment of the present invention. Particularly, the first information and the first parameter value may be transmitted by using a same message. To be specific, the message received by the UE and including the first information may further include the first parameter value.

S430. Determine the second time domain resource based on the first parameter value, and receive the second information on the second time domain resource.

In this embodiment of the present invention, when a transmission delay is reduced, the UE determines the second time domain resource based on the first parameter value. This can shorten a time interval between the first time domain resource for sending the first information and the second time domain resource for receiving the second information, so that a interval for receiving data is shorter. Therefore, performance gains of delay reduction can be obtained, transmission efficiency and a network throughput are improved, and transmission efficiency of a communications system is improved.

Optionally, in an embodiment, the first parameter value is a plurality of candidate time domain resources including the second time domain resource; and a specific implementation of the determining the second time domain resource based on the first parameter value is: performing blind detection on the plurality of candidate time domain resources to determine the second time domain resource.

For example, the first parameter value may be a set X={xi} of downlink subframes in which the second time domain resource is located; and the UE performs blind detection in the set to determine the second time domain resource.

Optionally, in another embodiment, that the first parameter value is used to indicate a location relationship between a first time domain resource and a second time domain resource includes: the first parameter value is a first time domain interval between the first time domain resource and the second time domain resource.

Further, in a possible implementation of this embodiment, a specific implementation of the determining the second time domain resource based on the first parameter value may be: determining the second time domain resource based on the first time domain interval and the first time domain resource.

It should be understood that, in this embodiment of the present invention, for a specific implementation in which the first parameter value is the first time domain interval between the first time domain resource and the second time domain resource, reference may be made to descriptions about the embodiment shown in FIG. 1.

Optionally, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource. Specifically, the first parameter value is an index of the mapping relationship corresponding to the first parameter value; or the first parameter value is a minimum time domain interval in the predefined mapping relationship corresponding to the first parameter value.

Further, a specific implementation of the determining the second time domain resource is: determining the mapping relationship corresponding to the first parameter value; determining, according to the mapping relationship, the first time domain interval corresponding to the first time domain resource; and determining the second time domain resource based on the first time domain interval and the first time domain resource.

Still further, when a carrier used by the base station to receive the second information is a TDD carrier, a specific implementation of the determining, according to the mapping relationship, the first time domain interval corresponding to the first time domain resource may be: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

It should be understood that, in this embodiment of the present invention, for a specific implementation in which the first parameter value corresponds to a predefined mapping relationship, reference may be made to descriptions about the embodiment shown in FIG. 1. Details are not described again herein in this embodiment of the present invention.

Optionally, a specific implementation of the determining the second time domain resource based on the first time domain interval and the first time domain resource may be: determining a time domain resource that is after the first time domain resource and is separated from the first time domain resource by the first time domain interval, as the second time domain resource.

Alternatively, optionally, a specific implementation of the determining the second time domain resource based on the first time domain interval and the first time domain resource may be: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource.

Alternatively, optionally, a specific implementation of the determining the second time domain resource based on the first time domain interval and the first time domain resource may be: if the third time domain resource is a downlink time domain resource or an unavailable time domain resource, determining a first available uplink time domain resource after the third time domain resource as the second time domain resource.

Optionally, in an embodiment, duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

Optionally, in an implementation of this embodiment, the time domain unit of the first time domain interval is a subframe; and before the determining the second time domain resource based on the first time domain interval and the first time domain resource, the method further includes: obtaining a second parameter value, where the second parameter value is used to indicate a location of the second time domain resource in a second subframe, and the second subframe is a subframe in which the second time domain resource is located; and the determining the second time domain resource based on the first time domain interval and the first time domain resource includes: determining the second subframe based on the first time domain interval and a first subframe, where the first subframe is a subframe in which the first time domain resource is located; and determining the location of the second time domain resource in the second subframe based on the second parameter value.

Optionally, in another possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of the determining the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

It should be understood that, in this embodiment of the present invention, for a specific implementation of the determining the second time domain resource based on the first time domain interval and the first time domain resource, reference may be made to descriptions about the embodiment shown in FIG. 1. Details are not described again herein in this embodiment of the present invention.

It should be understood that, the UE may obtain the first parameter value in a plurality of manners. The first parameter value may be predefined, or sent by the base station to the UE.

Optionally, in an embodiment, a specific implementation of the obtaining a first parameter value may be: obtaining indication information, where the indication information carries the first parameter value. The indication information may be sent together with the first information, or sent before the first information, or sent after the first information. This is not limited herein in this embodiment of the present invention.

Alternatively, optionally, a specific implementation of the obtaining a first parameter value may be: obtaining indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

It should be understood that, in this embodiment of the present invention, for an implementation of the first parameter value obtained by the UE, reference may be made to descriptions about the embodiment shown in FIG. 1. Details are not described again herein in this embodiment of the present invention.

Figure 5:
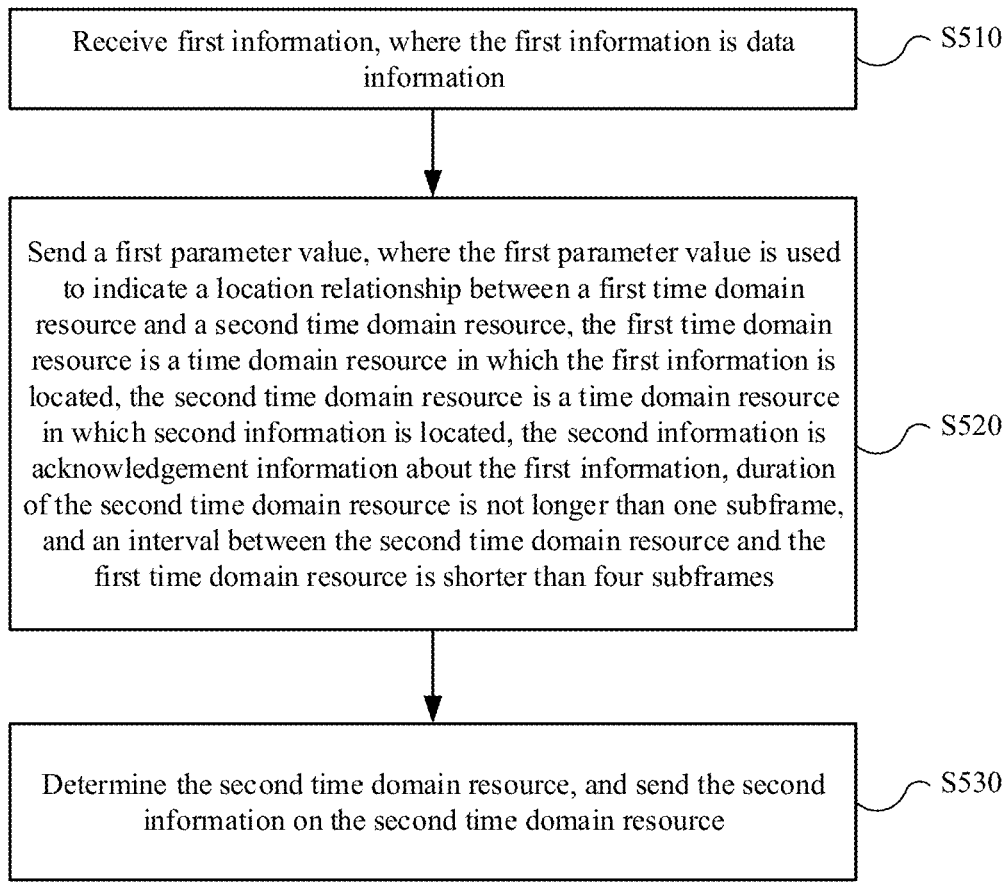
FIG. 5 is a schematic diagram of an information transmission method according to still another embodiment of the present invention.

FIG. 5 is a schematic diagram of an information transmission method according to still another embodiment of the present invention. The method in FIG. 5 is performed by a base station. The method includes the following steps.

S510. Receive first information, where the first information is data information.

S520. Send a first parameter value, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes.

It should be understood that, the first time domain resource mentioned in the present invention is the time domain resource in which the first information is located, and resources occupied for transmitting the first information may include all or some frequency domain resources, code domain resources, and space domain resources on the first time domain resource. Likewise, the second time domain resource mentioned in the present invention is the time domain resource in which the second information is located, and resources occupied for transmitting the second information may include all or some frequency domain resources, code domain resources, and space domain resources on the second time domain resource. It should be understood that, the first parameter value sent by a base station is used to indicate information about a time domain resource. Further, the base station may send information about a specific frequency domain resource, a code domain resource, a space domain resource, and the like on the time domain resource to UE. This is not limited in this embodiment of the present invention.

It should be understood that, one subframe mentioned in this embodiment of the present invention is a unit of a physical resource that occupies specific transmission duration, and duration of the subframe is predefined. One subframe may include two or more timeslots (slot), or include a plurality of symbols, for example, 10 symbols, or 14 symbols. Duration of one subframe may be 1 ms, or 0.5 ms, or 0.125 ms, or the like. A specific value is not limited in the present invention. When duration of one subframe is shortened, duration of timeslots or symbols in the subframe is also correspondingly shortened in proportion. For example, one subframe includes two timeslots, and duration of a timeslot in a 0.5 ms subframe is ½ duration of a timeslot in a 1 ms subframe.

It should be understood that, there is no strict time sequence between step S510 and step S520. Step S520 may be performed before step S510, or after step S510, or simultaneously with step S510. This is not limited herein in this embodiment of the present invention. For example, the first parameter value may be transmitted together with the first information in a same message, or transmitted before the first information, or transmitted after the first information.

S530. Determine the second time domain resource, and send the second information on the second time domain resource.

In this embodiment of the present invention, when a transmission delay is reduced, the base station sends the first parameter value to the UE, so that the UE determines the second time domain resource based on the first parameter value. This can shorten a time interval between the first time domain resource for receiving the first information and the second time domain resource for sending the second information, so that an interval for sending data or feeding back control information is shorter. Therefore, performance gains of delay reduction can be obtained, transmission efficiency and a network throughput are improved, and transmission efficiency of a communications system is improved.

Optionally, in an embodiment, the first parameter value is a plurality of candidate time domain resources including the second time domain resource; and a specific implementation of the determining the second time domain resource: selecting one of the plurality of candidate time domain resources as the second time domain resource.

Optionally, in another embodiment, that the first parameter value is used to indicate a location relationship between a first time domain resource and a second time domain resource includes: the first parameter value is a first time domain interval between the first time domain resource and the second time domain resource.

Further, in a possible implementation of this embodiment, a specific implementation of the determining the second time domain resource based on the first parameter value may be: determining the second time domain resource based on the first time domain interval and the first time domain resource.

It should be understood that, in this embodiment of the present invention, for a specific implementation in which the first parameter value is the first time domain interval between the first time domain resource and the second time domain resource, reference may be made to descriptions about the embodiment shown in FIG. 1.

Optionally, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource. Specifically, the first parameter value is an index of the mapping relationship corresponding to the first parameter value; or the first parameter value is a minimum time domain interval in the predefined mapping relationship corresponding to the first parameter value.

Further, the determining the second time domain resource is specifically: determining the mapping relationship corresponding to the first parameter value; determining, according to the mapping relationship, the first time domain interval corresponding to the first time domain resource; and determining the second time domain resource based on the first time domain interval and the first time domain resource.

Still further, when a carrier used by the base station to receive the second information is a TDD carrier, a specific implementation of the determining, according to the mapping relationship, the first time domain interval corresponding to the first time domain resource may be: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

It should be understood that, in this embodiment of the present invention, for a specific implementation in which the first parameter value corresponds to a predefined mapping relationship, reference may be made to descriptions about the embodiment shown in FIG. 1. Details are not described again herein in this embodiment of the present invention.

Optionally, a specific implementation of the determining the second time domain resource based on the first time domain interval and the first time domain resource may be: determining a time domain resource that is after the first time domain resource and is separated from the first time domain resource by the first time domain interval, as the second time domain resource.

Alternatively, optionally, a specific implementation of the determining the second time domain resource based on the first time domain interval and the first time domain resource may be: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource.

Alternatively, optionally, a specific implementation of the determining the second time domain resource based on the first time domain interval and the first time domain resource may be: if the third time domain resource is a downlink time domain resource or an unavailable time domain resource, determining a first available uplink time domain resource after the third time domain resource as the second time domain resource.

Optionally, in an embodiment, duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

Optionally, in an implementation of this embodiment, the time domain unit of the first time domain interval is a subframe; and before the determining the second time domain resource based on the first time domain interval and the first time domain resource, the method further includes: sending a second parameter value, where the second parameter value is used to indicate a location of the second time domain resource in a second subframe, and the second subframe is a subframe in which the second time domain resource is located; and the determining the second time domain resource based on the first time domain interval and the first time domain resource includes: determining the second subframe based on the first time domain interval and a first subframe, where the first subframe is a subframe in which the first time domain resource is located; and determining the location of the second time domain resource in the second subframe based on the second parameter value.

Optionally, in another possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of the determining the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

It should be understood that, in this embodiment of the present invention, for a specific implementation of the determining the second time domain resource based on the first time domain interval and the first time domain resource, reference may be made to descriptions about the embodiment shown in FIG. 1. Details are not described again herein in this embodiment of the present invention.

It should be understood that, the base station may send the first parameter value in a plurality of manners.

Optionally, in an embodiment, a specific implementation of the sending a first parameter value may be: sending indication information, where the indication information carries the first parameter value. The indication information may be sent together with the first information, or sent before the first information, or sent after the first information. This is not limited herein in this embodiment of the present invention.

Alternatively, optionally, a specific implementation of the sending a first parameter value may be: sending indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

It should be understood that, in this embodiment of the present invention, for a specific implementation of the first parameter value sent by the base station, reference may be made to the implementation of the first parameter value obtained by the UE in the embodiment shown in FIG. 1. Details are not described again herein in this embodiment of the present invention.

Figure 6:
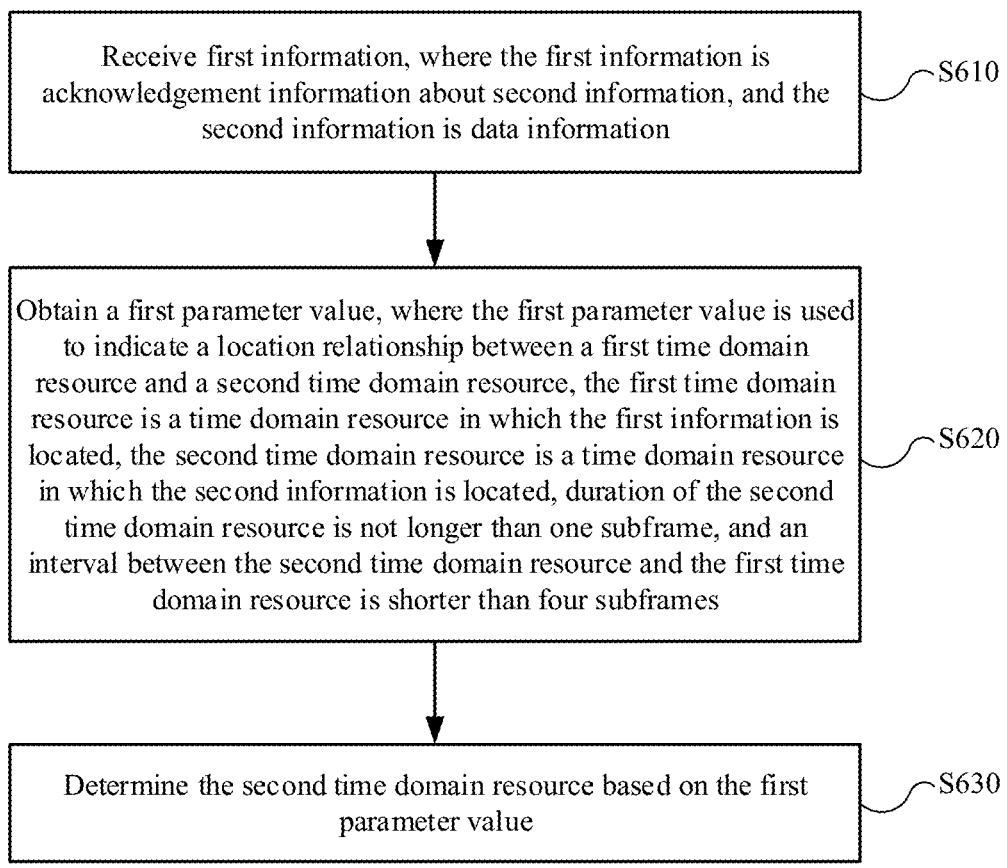
FIG. 6 is a schematic diagram of an information transmission method according to still another embodiment of the present invention.

FIG. 6 is a flowchart of a control information transmission method according to still another embodiment of the present invention. The method in FIG. 6 is performed by user equipment. The method includes the following steps.

S610. Receive first information, where the first information is acknowledgement information about second information, and the second information is data information.

S620. Obtain a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes.

It should be understood that, the first time domain resource mentioned in the present invention is the time domain resource in which the first information is located, and resources occupied for transmitting the first information may include all or some frequency domain resources, code domain resources, and space domain resources on the first time domain resource. Likewise, the second time domain resource mentioned in the present invention is the time domain resource in which the second information is located, and resources occupied for transmitting the second information may include all or some frequency domain resources, code domain resources, and space domain resources on the second time domain resource. It should be understood that, the first parameter value is used to indicate information about a time domain resource. Further, UE may obtain information about a specific frequency domain resource, a code domain resource, a space domain resource, and the like on the time domain resource. This is not limited in this embodiment of the present invention.

It should be understood that, one subframe mentioned in this embodiment of the present invention is a unit of a physical resource that occupies specific transmission duration, and duration of the subframe is predefined. One subframe may include two or more timeslots (slot), or include a plurality of symbols, for example, 10 symbols, or 14 symbols. Duration of one subframe may be 1 ms, or 0.5 ms, or 0.125 ms, or the like. A specific value is not limited in the present invention. When duration of one subframe is shortened, duration of timeslots or symbols in the subframe is also correspondingly shortened in proportion. For example, one subframe includes two timeslots, and duration of a timeslot in a 0.5 ms subframe is ½ duration of a timeslot in a 1 ms subframe.

It should be understood that, the first parameter value obtained by the UE may be sent by a network device such as a base station to the UE, or specified by a protocol.

It should be understood that, there is no strict time sequence between step S610 and step S620. Step S620 may be performed before step S610, or after step S610, or simultaneously with step S610. This is not limited herein in this embodiment of the present invention. Particularly, the first information and indication information may be transmitted by using a same message. To be specific, the message received by the UE and including the first information may further include the indication information.

S630. Determine the second time domain resource based on the first parameter value.

In this embodiment of the present invention, when a transmission delay is reduced, the UE determines the second time domain resource based on the first parameter value. This can shorten a time interval between the second time domain resource for sending the second information and the first time domain resource for receiving the first information, so that an interval for receiving data is shorter. Therefore, performance gains of delay reduction can be obtained, transmission efficiency and a network throughput are improved, and transmission efficiency of a communications system is improved.

Optionally, in an embodiment, that the first parameter value is used to indicate a location relationship between a first time domain resource and a second time domain resource includes: the first parameter value is a first time domain interval between the first time domain resource and the second time domain resource.

Further, in a possible implementation of this embodiment, a specific implementation of the determining the second time domain resource based on the first parameter value may be: determining the second time domain resource based on the first time domain interval and the first time domain resource.

It should be understood that, in this embodiment of the present invention, for a specific implementation in which the first parameter value is the first time domain interval between the first time domain resource and the second time domain resource, reference may be made to descriptions about the embodiment shown in FIG. 1.

Optionally, in another embodiment, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource. Specifically, the first parameter value is an index of the mapping relationship corresponding to the first parameter value; or the first parameter value is a minimum time domain interval in the predefined mapping relationship corresponding to the first parameter value.

Further, a specific implementation of the determining the second time domain resource is: determining the mapping relationship corresponding to the first parameter value; determining, according to the mapping relationship, the first time domain interval corresponding to the first time domain resource; and determining the second time domain resource based on the first time domain interval and the first time domain resource.

Still further, when a carrier used by the UE to send the second information is a TDD carrier, a specific implementation of the determining, according to the mapping relationship, the first time domain interval corresponding to the first time domain resource may be:

determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

It should be understood that, in this embodiment of the present invention, for a specific implementation in which the first parameter value corresponds to a predefined mapping relationship, reference may be made to descriptions about the embodiment shown in FIG. 1. Details are not described again herein in this embodiment of the present invention.

Optionally, a specific implementation of the determining the second time domain resource based on the first time domain interval and the first time domain resource may be: determining a time domain resource that is before the first time domain resource and is separated from the first time domain resource by the first time domain interval, as the second time domain resource.

For example, if the first time domain resource is a subframe n, and the first time domain interval is k, the UE may determine a subframe n−k as the second time domain resource, and further obtain the second information (data information) corresponding to the first information (acknowledgement information).

Optionally, in an embodiment, duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

Optionally, in an implementation of this embodiment, the time domain unit of the first time domain interval is a subframe; and before the determining the second time domain resource based on the first time domain interval and the first time domain resource, the method further includes: obtaining a second parameter value, where the second parameter value is used to indicate a location of the second time domain resource in a second subframe, and the second subframe is a subframe in which the second time domain resource is located; and the determining the second time domain resource based on the first time domain interval and the first time domain resource includes: determining the second subframe based on the first time domain interval and a first subframe, where the first subframe is a subframe in which the first time domain resource is located; and determining the location of the second time domain resource in the second subframe based on the second parameter value.

Optionally, in another possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of the determining the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

It should be understood that, the UE may obtain the first parameter value in a plurality of manners. The first parameter value may be predefined, or sent by the base station to the UE.

Optionally, in an embodiment, a specific implementation of the obtaining a first parameter value may be: obtaining indication information, where the indication information carries the first parameter value. The indication information may be sent together with the first information, or sent before the first information, or sent after the first information. This is not limited herein in this embodiment of the present invention.

Alternatively, optionally, a specific implementation of the obtaining a first parameter value may be: obtaining indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

It should be understood that, in this embodiment of the present invention, for an implementation of the first parameter value obtained by the UE, reference may be made to descriptions about the embodiment shown in FIG. 1. Details are not described again herein in this embodiment of the present invention.

Figure 7:
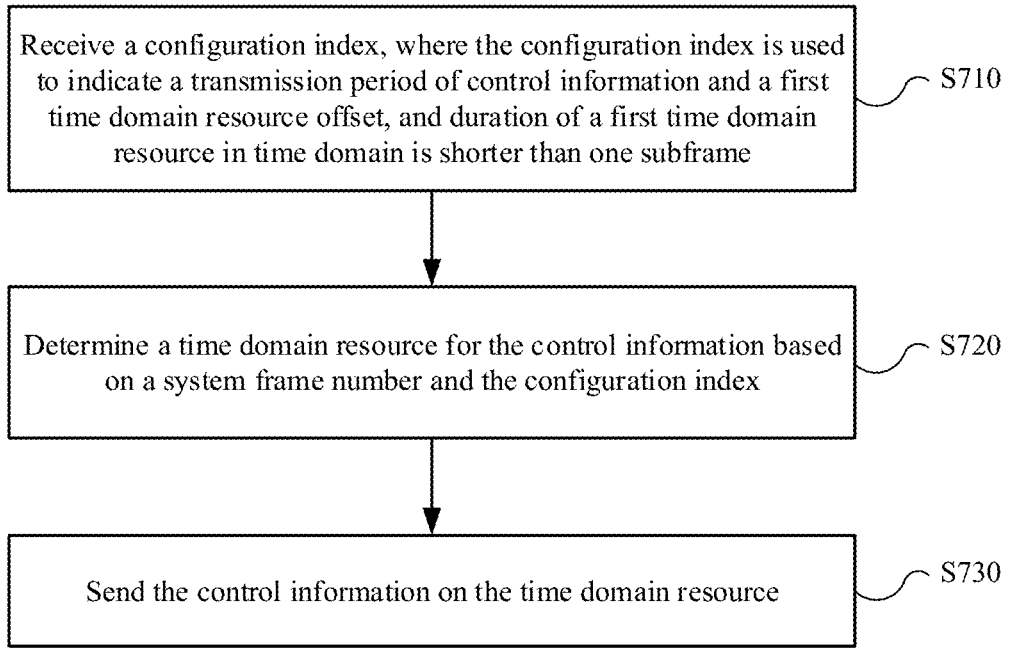
FIG. 7 is a schematic diagram of an information transmission method according to still another embodiment of the present invention.

FIG. 7 is a flowchart of an information transmission method according to still another embodiment of the present invention. The method in FIG. 7 is performed by user equipment. The method includes the following steps.

S710. Receive a configuration index, where the configuration index is used to indicate a transmission period of control information and a first time domain resource offset, and duration of a first time domain resource is shorter than one subframe.

It should be understood that, one subframe mentioned in this embodiment of the present invention is a unit of a physical resource that occupies specific transmission duration, and duration of the subframe is predefined. One subframe may include two or more timeslots (slot), or include a plurality of symbols, for example, 10 symbols, or 14 symbols. Duration of one subframe may be 1 ms, or 0.5 ms, or 0.125 ms, or the like. A specific value is not limited in the present invention. When duration of one subframe is shortened, duration of timeslots or symbols in the subframe is also correspondingly shortened in proportion. For example, one subframe includes two timeslots, and duration of a timeslot in a 0.5 ms subframe is ½ duration of a timeslot in a 1 ms subframe.

It should be understood that, in this embodiment of the present invention, the control information may include channel state information (CSI), a scheduling request (SR), hybrid automatic repeat request (HARQ) acknowledgement information, or the like. The HARQ acknowledgement information may include ACK (Acknowledgement)/NACK (Negative Acknowledgement) information.

S720. Determine a time domain resource for the control information based on a system frame number and the configuration index.

It should be understood that, the time domain resource is a time domain resource in which the control information is located, and resources occupied for transmitting the control information may include all or some frequency domain resources, code domain resources, and space domain resources on the time domain resource.

S730. Send the control information on the time domain resource.

In this embodiment of the present invention, to reduce a delay in the transmission method, duration occupied by each transmission of control information is shortened, and a resource for transmitting the control information is determined accordingly. Therefore, a transmission delay of the control information is reduced, a speed of transmitting the control information such as the CSI, the SR, and the HARQ acknowledgement information is increased, a processing time of a whole system is reduced, and system performance is improved.

In the prior art, a formula for periodically feeding back control information is:

$$(10 \times n_f + \lfloor n_s/2 \rfloor - N_{OFFSET}) \text{Mod}(N_{pd}) = 0,$$

where $n_f$ indicates a system frame number, $n_s$ indicates a time domain location of the first time domain resource, $N_{offset}$ indicates a time domain resource offset corresponding to a type of the control information, $N_{pd}$ indicates a transmission period of the control information, a unit of $n_f$ is a subframe, a unit of $n_s$ is a timeslot, and units of both $N_{offset}$ and $N_{pd}$ are subframes.

$N_{offset}$ indicates the time domain resource offset corresponding to the type of the control information. For example, three types of control information, that is, CSI, an SR, and HARQ acknowledgement information, may correspond to three different time domain resource offsets.

Optionally, in an embodiment, the determining a time domain resource for the control information based on a system frame number and the configuration index includes: determining a location of the time domain resource according to a product $M * n_f$ of a system frame number of and M, and the configuration index, where M is determined according to duration of the subframe and duration of the time domain resource, and M is a positive integer.

For example, the time domain resource may be determined according to a formula $(M \times n_f) + n_s - N_{OFFSET}) \text{mod} (N_{pd}) = 0$. A value of M, for example, may be equal to the duration of the subframe divided by the duration of the time domain resource. If the duration of the subframe divided by the duration of the time domain resource is not an integer, an integer part is used as the value of M. To be specific, M=⌊Duration of the subframe/Duration of the time domain resource⌋. Alternatively, a value of M is determined in a predefined manner according to the duration of the subframe and the duration of the first time domain resource. For example, using an LTE system as an example, given a normal CP, one subframe includes 14 symbols; and when the duration of the first time domain resource is 2 OFDM Symbols (OSs), M=6 or 7; when the duration of the first time domain resource is 4 OSs, M=3 or 4; or when the duration of the first time domain resource is 7 OSs, M=2. For another example, given an extended CP, one subframe includes 12 symbols; and when the duration of the first time domain resource is 2 OSs, M=5 or 6; when the duration of the first time domain resource is 4 OSs, M=3 or 4; or when the duration of the first time domain resource is 6 OSs, M=2.

Alternatively, optionally, in another embodiment, the determining a time domain resource for the control information based on a system frame number and the configuration index includes: determining a location of the time domain resource according to a product $M * 10 * n_f$ of a system frame number $n_f$ and M, and the configuration index, where M is determined according to duration of the subframe and duration of the time domain resource, and M is a positive integer. Alternatively, a value of M is determined in a predefined manner according to the duration of the subframe and the duration of the first time domain resource. For example, using an LTE system as an example, given a normal CP, one subframe includes 14 symbols; and when the duration of the first time domain resource is 2 OSs, M=6 or 7; when the duration of the first time domain resource is 4 OSs, M=3 or 4; or when the duration of the first time domain resource is 7 OSs, M=2. For another example, given an extended CP, one subframe includes 12 symbols; and when the duration of the first time domain resource is 2 OSs, M=5 or 6; when the duration of the first time domain resource is 4 OSs, M=3 or 4; or when the duration of the first time domain resource is 6 OSs, M=2.

For example, the time domain resource may be determined according to a formula $(M \times 10 \times n_f + n_s - N_{OFFSET})$ mod $(N_{pd})=0$.

Optionally, in an embodiment, the transmission period is shorter than duration of five subframes and longer than duration of one subframe in time domain. For example, a value of the transmission period may be two subframes, three subframes, or four subframes, or the like.

Optionally, in another embodiment, duration of a time domain unit of at least one of the transmission period and the first time domain resource offset indicated by the configuration index is the same as duration of the time domain resource in time domain.

For example, the time domain units of both the transmission period and the time domain resource offset are timeslots, and the duration of the time domain resource in time domain is also a timeslot. For another example, the time domain unit of the transmission period is a timeslot, the time domain unit of the time domain resource offset is a timeslot, and the duration of the time domain resource in time domain is also a timeslot.

Optionally, in another embodiment, a specific implementation of the determining a time domain resource for the control information based on a system frame number and the configuration index may be:

determining the transmission period and the first time domain resource offset according to the configuration index; and determining the time domain resource based on the system frame number, the transmission period, the first time domain resource offset, and a second time domain resource offset; where the first time domain resource offset is an offset associated with a type of the control information, the first time domain resource offset is used to indicate an offset of the control information in the transmission period, and duration of the second time domain resource offset is equal to duration of one or more of the time domain resources, or duration of the second time domain resource offset is equal to duration of one subframe.

Further, the second time domain resource offset is predefined; or the second time domain resource offset is sent by a base station to UE.

Optionally, in an embodiment, a specific implementation of the determining a time domain resource for the control information based on a system frame number and the configuration index may be: determining a candidate time domain resource based on the system frame number and the configuration index; and if the candidate time domain resource is an available uplink time domain resource, determining the candidate time domain resource as the time domain resource for the control information.

Using Table 2 as an example, assuming that a TDD uplink-downlink configuration of the UE is 1, and the candidate time domain resource determined based on the system frame number and the configuration index is a slot 14, because the slot 14 is an available uplink time domain resource when the TDD uplink-downlink configuration of the UE is 1, the slot 14 may be determined as the time domain resource for the control information, that is, the UE may send the control information in the slot 14.

Alternatively, optionally, in another embodiment, a specific implementation of the determining a time domain resource for the control information based on a system frame number and the configuration index may be: determining a candidate time domain resource based on the system frame number and the configuration index; and if the candidate time domain resource is a downlink time domain resource or an unavailable time domain resource, determining a first available uplink time domain resource after the time domain resource as the time domain resource for the control information.

Still using Table 2 as an example, assuming that a TDD uplink-downlink configuration of the UE is 1, and the candidate time domain resource determined based on the system frame number and the configuration index is a slot 13, because the slot 13 is a special timeslot and is not an available uplink time domain resource when the TDD uplink-downlink configuration of the UE is 1, a first available time domain resource after the slot 13 is determined as the time domain resource for the control information, that is, the slot 14 is determined as the time domain resource for the control information, and then the UE may send the control information in the slot 14.

Figure 8:
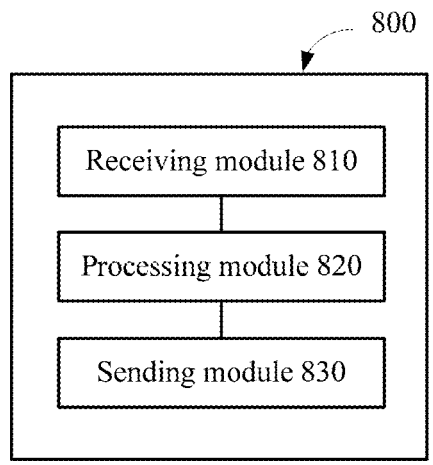
FIG. 8 is a schematic structural diagram of user equipment according to an embodiment of the present invention.

FIG. 8 is a schematic structural diagram of user equipment 800 according to an embodiment of the present invention. As shown in FIG. 8, the user equipment 800 may include a sending module 830, a receiving module 810, and a processing module 820, where the receiving module 810 is configured to receive first information, where the first information is used to instruct the UE to send second information;

the processing module 820 is configured to obtain a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes;

the processing module 820 is further configured to determine the second time domain resource based on the first parameter value; and the sending module 830 is configured to send the second information on the second time domain resource.

In this embodiment of the present invention, when a transmission delay is reduced, the user equipment 800 determines the second time domain resource based on the first parameter value. This can shorten a time interval between the first time domain resource for receiving the first information and the second time domain resource for sending the second information. Therefore, an interval for sending data or feeding back control information is shorter, performance gains of delay reduction can be obtained, and transmission efficiency and a network throughput are improved.

It should be understood that, in a specific application, the sending module 830 may be a transmitter, the receiving module 810 may be a receiver, and the processing module may be a processor. Further, the transmitter and the receiver may be coupled to an antenna.

Optionally, in an embodiment, the first information is scheduling information, and the second information is uplink data information scheduled according to the scheduling information. In this embodiment of the present invention, the UE may shorten a transmission interval between the scheduling information and uplink data to improve uplink data transmission efficiency and the network throughput.

Alternatively, optionally, in an embodiment, the first information is scheduling information, and the second information is uplink control information scheduled according to the scheduling information. For example, the control information is aperiodic CSI, and the scheduling information is CSI trigger information.

Alternatively, optionally, in an embodiment, the first information is downlink control information, and the second information is feedback information about the downlink control information. In this embodiment of the present invention, the UE may shorten a transmission interval between the downlink control information and the feedback information to improve uplink control information feedback efficiency.

Alternatively, optionally, in an embodiment, the first information is downlink data information, and the second information is acknowledgement information about the downlink data information. It should be understood that, herein the acknowledgement information may include positive acknowledgement information (ACK) or negative acknowledgement (NACK) information. In this embodiment of the present invention, the UE may shorten a transmission interval between the downlink data information and the acknowledgement information to improve acknowledgement information feedback efficiency.

Optionally, in an embodiment, that the first parameter value is used to indicate a location relationship between a first time domain resource and a second time domain resource includes: the first parameter value is a first time domain interval between the first time domain resource and the second time domain resource.

Further, in a possible implementation of this embodiment, the processing module 820 is specifically configured to determine the second time domain resource based on the first time domain interval and the first time domain resource.

Optionally, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource. Specifically, the first parameter value is an index of the mapping relationship corresponding to the first parameter value; or the first parameter value is a minimum time domain interval in the predefined mapping relationship corresponding to the first parameter value.

Further, the processing module 820 is specifically configured to: determine the mapping relationship corresponding to the first parameter value; determine, according to the mapping relationship, the first time domain interval corresponding to the first time domain resource; and determine the second time domain resource based on the first time domain interval and the first time domain resource.

Still further, when a carrier used by the UE to send the second information is a TDD carrier, a specific implementation of determining, by the processing module 820 according to the mapping relationship, the first time domain interval corresponding to the first time domain resource may be: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

Optionally, a specific implementation of determining, by the processing module 820, the second time domain resource based on the first time domain interval and the first time domain resource may be: determining a time domain resource that is after the first time domain resource and is separated from the first time domain resource by the first time domain interval, as the second time domain resource.

Alternatively, optionally, a specific implementation of determining, by the processing module 820, the second time domain resource based on the first time domain interval and the first time domain resource may be: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource.

Alternatively, optionally, a specific implementation of determining, by the processing module 820, the second time domain resource based on the first time domain interval and the first time domain resource may be: if the third time domain resource is a downlink time domain resource or an unavailable time domain resource, determining a first available uplink time domain resource after the third time domain resource as the second time domain resource.

Optionally, in an embodiment, duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

Optionally, in an implementation of this embodiment, the time domain unit of the first time domain interval is a subframe; and the processing module 820 is further configured to obtain a second parameter value, where the second parameter value is used to indicate a location of the second time domain resource in a second subframe, and the second subframe is a subframe in which the second time domain resource is located; and a specific implementation of determining, by the processing module 820, the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

Optionally, in another possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of determining, by the processing module 820, the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

It should be understood that, the UE may obtain the first parameter value in a plurality of manners. The first parameter value may be predefined, or sent by a base station to the UE.

Optionally, in an embodiment, a specific implementation of obtaining, by the processing module 820, the first parameter value may be: obtaining indication information, where the indication information carries the first parameter value. The indication information may be sent together with the first information, or sent before the first information, or sent after the first information. This is not limited herein in this embodiment of the present invention.

Alternatively, optionally, a specific implementation of obtaining, by the processing module 820, the first parameter value is: obtaining indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

In addition, the user equipment 800 may further perform the method in FIG. 1, and implement functions of the user equipment in the embodiment shown in FIG. 1. Details are not described again herein in this embodiment of the present invention.

Figure 9:
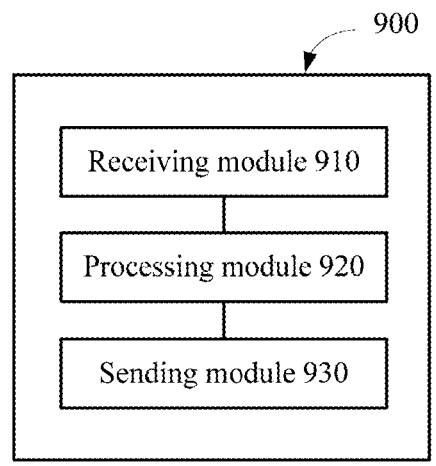
FIG. 9 is a schematic structural diagram of a base station according to an embodiment of the present invention.

FIG. 9 is a schematic structural diagram of a base station 900 according to an embodiment of the present invention. As shown in FIG. 9, the base station 900 may include a sending module 930, a receiving module 910, and a processing module 920, where the sending module 930 is configured to send first information, where the first information is used to instruct UE to send second information;

the sending module 930 is further configured to send a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes;

the processing module 920 is configured to determine the second time domain resource; and the receiving module 910 is configured to receive the second information on the second time domain resource.

In this embodiment of the present invention, when a transmission delay is reduced, the base station 900 sends the first parameter value to the UE, so that the UE determines the second time domain resource based on the first parameter value. This can shorten a time interval between the first time domain resource for sending the first information and the second time domain resource for receiving the second information, so that an interval for receiving data or receiving control information of feedback is shorter. Therefore, performance gains of delay reduction can be obtained, transmission efficiency and a network throughput are improved, and transmission efficiency of a communications system is improved.

Optionally, in an embodiment, the first information is scheduling information, and the second information is uplink data information scheduled according to the scheduling information. In this embodiment of the present invention, the base station sends a first parameter value to the UE, so that the UE can shorten a transmission interval between the scheduling information and uplink data according to the first reference value to improve uplink data transmission efficiency and the network throughput.

Alternatively, optionally, in an embodiment, the first information is scheduling information, and the second information is uplink control information scheduled according to the scheduling information. For example, the control information is aperiodic CSI, and the scheduling information is CSI trigger information.

Alternatively, optionally, in an embodiment, the first information is downlink control information, and the second information is feedback information about the downlink control information. In this embodiment of the present invention, the base station sends the first reference value to the UE, so that the UE can shorten a transmission interval between the downlink control information and the feedback information according to the first reference value to improve uplink control information feedback efficiency.

Alternatively, optionally, in an embodiment, the first information is downlink data information, and the second information is acknowledgement information about the downlink data information. It should be understood that herein the acknowledgement information may include ACK information or NACK information. In this embodiment of the present invention, the base station sends the first reference value to the UE, so that the UE can shorten a transmission interval between the downlink data information and the acknowledgement information according to the first reference value to improve acknowledgement information feedback efficiency.

Optionally, in an embodiment, that the first parameter value is used to indicate a location relationship between a first time domain resource and a second time domain resource includes: the first parameter value is a first time domain interval between the first time domain resource and the second time domain resource.

Further, in a possible implementation of this embodiment, a specific implementation of determining, by the processing module 920, the second time domain resource based on the first parameter value may be: determining the second time domain resource based on the first time domain interval and the first time domain resource.

Optionally, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource. Specifically, the first parameter value is an index of the mapping relationship corresponding to the first parameter value; or the first parameter value is a minimum time domain interval in the predefined mapping relationship corresponding to the first parameter value.

Further, a specific implementation of determining, by the processing module 920, the second time domain resource may be: determining the mapping relationship corresponding to the first parameter value; determining, according to the mapping relationship, the first time domain interval corresponding to the first time domain resource; and determining the second time domain resource based on the first time domain interval and the first time domain resource.

Still further, when a carrier used by the UE to send the second information is a TDD carrier, a specific implementation of determining, by the processing module 920 according to the mapping relationship, the first time domain interval corresponding to the first time domain resource may be: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

Optionally, a specific implementation of determining, by the processing module 920, the second time domain resource based on the first time domain interval and the first time domain resource may be: determining a time domain resource that is after the first time domain resource and is separated from the first time domain resource by the first time domain interval, as the second time domain resource.

Alternatively, optionally, a specific implementation of determining, by the processing module 920, the second time domain resource based on the first time domain interval and the first time domain resource may be: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource.

Alternatively, optionally, a specific implementation of determining, by the processing module 920, the second time domain resource based on the first time domain interval and the first time domain resource may be: if the third time domain resource is a downlink time domain resource or an unavailable time domain resource, determining a first available uplink time domain resource after the third time domain resource as the second time domain resource.

Optionally, in an embodiment, duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

Optionally, in an implementation of this embodiment, the time domain unit of the first time domain interval is a subframe; and the sending module 930 is further configured to send a second parameter value, where the second parameter value is used to indicate a location of the second time domain resource in a second subframe, and the second subframe is a subframe in which the second time domain resource is located; and a specific implementation of determining, by the processing module 920, the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

Optionally, in another possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of determining, by the processing module 920, the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

It should be understood that, the base station 900 may send the first parameter value in a plurality of manners.

Optionally, in an embodiment, a specific implementation of sending, by the sending module 930, the first parameter value may be: sending indication information, where the indication information carries the first parameter value. The indication information may be sent together with the first information, or sent before the first information, or sent after the first information. This is not limited herein in this embodiment of the present invention.

Alternatively, optionally, a specific implementation of sending, by the sending module 930, the first parameter value may be: sending indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

In addition, the base station 900 may further perform the method in FIG. 3, and implement functions of the base station in the embodiment shown in FIG. 3. Details are not described again herein in this embodiment of the present invention.

Figure 10:
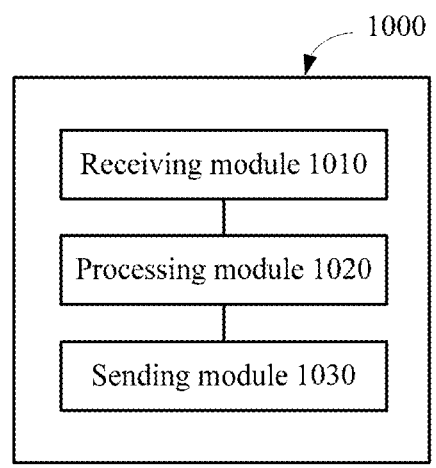
FIG. 10 is a schematic structural diagram of user equipment according to another embodiment of the present invention.

FIG. 10 is a schematic structural diagram of user equipment 1000 according to an embodiment of the present invention. As shown in FIG. 10, the user equipment 1000 may include a sending module 1030, a receiving module 1010, and a processing module 1020, where the sending module 1030 is configured to send first information, where the first information is data information;

the processing module 1020 is configured to obtain a first parameter value, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes;

the processing module 1020 is further configured to determine the second time domain resource based on the first parameter value; and the receiving module 1010 is configured to receive the second information on the second time domain resource.

In this embodiment of the present invention, when a transmission delay is reduced, the user equipment 1000 determines the second time domain resource based on the first parameter value. This can shorten a time interval between the first time domain resource for sending the first information and the second time domain resource for receiving the second information, so that an interval for receiving data is shorter. Therefore, performance gains of delay reduction can be obtained, transmission efficiency and a network throughput are improved, and transmission efficiency of a communications system is improved.

It should be understood that, in a specific application, the sending module 1030 may be a transmitter, the receiving module 1010 may be a receiver, and the processing module may be a processor. Further, the transmitter and the receiver may be coupled to an antenna.

Optionally, in an embodiment, the first parameter value is a plurality of candidate time domain resources including the second time domain resource; and a specific implementation of determining, by the processing module 1020, the second time domain resource based on the first parameter value: performing blind detection on the plurality of candidate time domain resources to determine the second time domain resource.

Optionally, in another embodiment, that the first parameter value is used to indicate a location relationship between a first time domain resource and a second time domain resource includes: the first parameter value is a first time domain interval between the first time domain resource and the second time domain resource.

Further, in a possible implementation of this embodiment, the processing module 1020 is specifically configured to determine the second time domain resource based on the first time domain interval and the first time domain resource.

Optionally, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource.

Specifically, the first parameter value is an index of the mapping relationship corresponding to the first parameter value; or the first parameter value is a minimum time domain interval in the predefined mapping relationship corresponding to the first parameter value.

Further, the processing module 1020 is specifically configured to: determine the mapping relationship corresponding to the first parameter value; determine, according to the mapping relationship, the first time domain interval corresponding to the first time domain resource; and determine the second time domain resource based on the first time domain interval and the first time domain resource.

Still further, when a carrier used by the UE to send the second information is a TDD carrier, a specific implementation of determining, by the processing module 1020 according to the mapping relationship, the first time domain interval corresponding to the first time domain resource may be: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

Optionally, a specific implementation of determining, by the processing module 1020, the second time domain resource based on the first time domain interval and the first time domain resource may be: determining a time domain resource that is after the first time domain resource and is separated from the first time domain resource by the first time domain interval, as the second time domain resource.

Alternatively, optionally, a specific implementation of determining, by the processing module 1020, the second time domain resource based on the first time domain interval and the first time domain resource may be: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource.

Alternatively, optionally, a specific implementation of determining, by the processing module 1020, the second time domain resource based on the first time domain interval and the first time domain resource may be: if the third time domain resource is a downlink time domain resource or an unavailable time domain resource, determining a first available uplink time domain resource after the third time domain resource as the second time domain resource.

Optionally, in an embodiment, duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

Optionally, in an implementation of this embodiment, the time domain unit of the first time domain interval is a subframe; and the processing module 1020 is further configured to obtain a second parameter value, where the second parameter value is used to indicate a location of the second time domain resource in a second subframe, and the second subframe is a subframe in which the second time domain resource is located; and a specific implementation of determining, by the processing module 1020, the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

Optionally, in another possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of determining, by the processing module 1020, the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

It should be understood that, the UE may obtain the first parameter value in a plurality of manners. The first parameter value may be predefined, or sent by a base station to the UE.

Optionally, in an embodiment, a specific implementation of obtaining, by the processing module 1020, the first parameter value may be: obtaining indication information, where the indication information carries the first parameter value. The indication information may be sent together with the first information, or sent before the first information, or sent after the first information. This is not limited herein in this embodiment of the present invention.

Alternatively, optionally, a specific implementation of obtaining, by the processing module 1020, the first parameter value is: obtaining indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

In addition, the user equipment 1000 may further perform the method in FIG. 4, and implement functions of the user equipment in the embodiment shown in FIG. 4. Details are not described again herein in this embodiment of the present invention.

Figure 11:
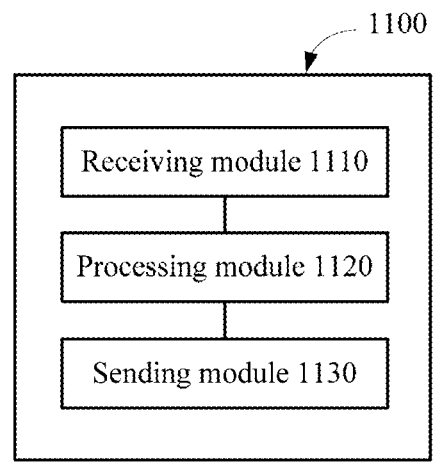
FIG. 11 is a schematic structural diagram of a base station according to another embodiment of the present invention.

FIG. 11 is a schematic structural diagram of a base station 1100 according to an embodiment of the present invention. As shown in FIG. 11, the base station 1100 may include a sending module 1130, a receiving module 1110, and a processing module 1120, where the receiving module 1110 is configured to receive first information, where the first information is data information;

the sending module 1130 is configured to send a first parameter value, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes;

the processing module 1120 is configured to determine the second time domain resource; and the sending module 1130 is configured to send the second information on the second time domain resource.

In this embodiment of the present invention, when a transmission delay is reduced, the base station 1100 sends the first parameter value to UE, so that the UE determines the second time domain resource based on the first parameter value. This can shorten a time interval between the first time domain resource for receiving the first information and the second time domain resource for sending the second information, so that an interval for sending data or feeding back control information is shorter. Therefore, performance gains of delay reduction can be obtained, transmission efficiency and a network throughput are improved, and transmission efficiency of a communications system is improved.

Optionally, in an embodiment, the first parameter value is a plurality of candidate time domain resources including the second time domain resource; and a specific implementation of determining, by the processing module 1120, the second time domain resource: selecting one of the plurality of candidate time domain resources as the second time domain resource.

Optionally, in another embodiment, that the first parameter value is used to indicate a location relationship between a first time domain resource and a second time domain resource includes: the first parameter value is a first time domain interval between the first time domain resource and the second time domain resource.

Further, in a possible implementation of this embodiment, a specific implementation of determining, by the processing module 1120, the second time domain resource based on the first parameter value may be: determining the second time domain resource based on the first time domain interval and the first time domain resource.

Optionally, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource. Specifically, the first parameter value is an index of the mapping relationship corresponding to the first parameter value; or the first parameter value is a minimum time domain interval in the predefined mapping relationship corresponding to the first parameter value.

Further, a specific implementation of determining, by the processing module 1120, the second time domain resource may be: determining the mapping relationship corresponding to the first parameter value; determining, according to the mapping relationship, the first time domain interval corresponding to the first time domain resource; and determining the second time domain resource based on the first time domain interval and the first time domain resource.

Still further, when a carrier used by the base station to receive the second information is a TDD carrier, a specific implementation of determining, by the processing module 1120 according to the mapping relationship, the first time domain interval corresponding to the first time domain resource may be: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

Optionally, a specific implementation of determining, by the processing module 1120, the second time domain resource based on the first time domain interval and the first time domain resource may be: determining a time domain resource that is after the first time domain resource and is separated from the first time domain resource by the first time domain interval, as the second time domain resource.

Alternatively, optionally, a specific implementation of determining, by the processing module 1120, the second time domain resource based on the first time domain interval and the first time domain resource may be: determining a third time domain resource, where the third time domain resource is a time domain resource that is after the first time domain resource and is separated from the first time domain resource by the first time domain interval; and if the third time domain resource is an available uplink time domain resource, determining the third time domain resource as the second time domain resource.

Alternatively, optionally, a specific implementation of determining, by the processing module 1120, the second time domain resource based on the first time domain interval and the first time domain resource may be: if the third time domain resource is a downlink time domain resource or an unavailable time domain resource, determining a first available uplink time domain resource after the third time domain resource as the second time domain resource.

Optionally, in an embodiment, duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

Optionally, in an implementation of this embodiment, the time domain unit of the first time domain interval is a subframe; and the sending module 1130 is further configured to send a second parameter value, where the second parameter value is used to indicate a location of the second time domain resource in a second subframe, and the second subframe is a subframe in which the second time domain resource is located; and a specific implementation of determining, by the processing module 1120, the second time domain resource based on the first time domain interval and the first time domain resource is: determining the second subframe based on the first time domain interval and a first subframe, where the first subframe is a subframe in which the first time domain resource is located; and determining the location of the second time domain resource in the second subframe based on the second parameter value.

Optionally, in another possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of determining, by the processing module 1120, the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

It should be understood that, the base station 1100 may send the first parameter value in a plurality of manners.

Optionally, in an embodiment, a specific implementation of sending, by the sending module 1130, the first parameter value may be: sending indication information, where the indication information carries the first parameter value. The indication information may be sent together with the first information, or sent before the first information, or sent after the first information. This is not limited herein in this embodiment of the present invention.

Alternatively, optionally, a specific implementation of sending, by the sending module 1130, the first parameter value may be: sending indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

In addition, the base station 1100 may further perform the method in FIG. 5, and implement functions of the base station in the embodiment shown in FIG. 5. Details are not described again herein in this embodiment of the present invention.

Figure 12:
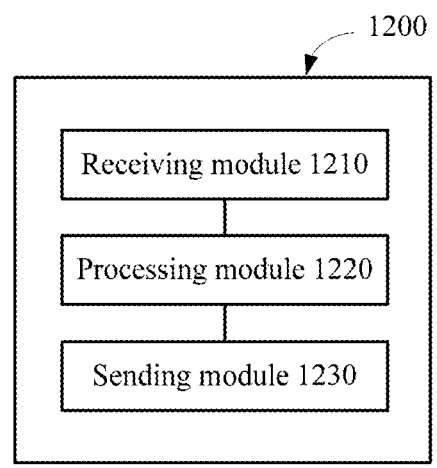
FIG. 12 is a schematic structural diagram of user equipment according to still another embodiment of the present invention.

FIG. 12 is a schematic structural diagram of user equipment 1200 according to an embodiment of the present invention. As shown in FIG. 12, the user equipment 1200 may include a sending module 1230, a receiving module 1210, and a processing module 1220, where the receiving module 1210 is configured to receive first information, where the first information is acknowledgement information about second information, and the second information is data information;

the processing module 1220 is configured to obtain a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes; and the processing module 1220 is further configured to determine the second time domain resource based on the first parameter value.

In this embodiment of the present invention, when a transmission delay is reduced, the user equipment 1200 determines the second time domain resource based on the first parameter value. This shortens a time interval between the second time domain resource for sending the second information and the first time domain resource for receiving the first information, so that an interval for receiving data is shorter. Therefore, performance gains of delay reduction can be obtained, transmission efficiency and a network throughput are improved, and transmission efficiency of a communications system is improved.

Optionally, in an embodiment, that the first parameter value is used to indicate a location relationship between a first time domain resource and a second time domain resource includes: the first parameter value is a first time domain interval between the first time domain resource and the second time domain resource.

Further, in a possible implementation of this embodiment, a specific implementation of determining, by the processing module 1220, the second time domain resource based on the first parameter value may be: determining the second time domain resource based on the first time domain interval and the first time domain resource.

Optionally, in another embodiment, that the first parameter value is used to indicate a location relationship between a first time domain resource and a second time domain resource includes: the first parameter value corresponds to a predefined mapping relationship, where the mapping relationship includes a correspondence between a location of the first time domain resource and a first time domain interval, and the first time domain interval is a time domain interval between the first time domain resource and the second time domain resource. Specifically, the first parameter value is an index of the mapping relationship corresponding to the first parameter value; or the first parameter value is a minimum time domain interval in the predefined mapping relationship corresponding to the first parameter value.

Further, a specific implementation of determining, by the processing module 1220, the second time domain resource is: determining the mapping relationship corresponding to the first parameter value; determining, according to the mapping relationship, the first time domain interval corresponding to the first time domain resource; and determining the second time domain resource based on the first time domain interval and the first time domain resource.

Still further, when a carrier used by the UE to send the second information is a TDD carrier, a specific implementation of determining, by the processing module 1220 according to the mapping relationship, the first time domain interval corresponding to the first time domain resource may be: determining, according to the mapping relationship, the first time domain resource and a first time domain interval corresponding to a TDD uplink-downlink configuration of the UE; where the predefined mapping relationship includes a first time domain interval corresponding to the first time domain resource in each TDD uplink-downlink configuration in a plurality of TDD uplink-downlink configurations.

Optionally, a specific implementation of determining, by the processing module 1220, the second time domain resource based on the first time domain interval and the first time domain resource may be: determining a time domain resource that is before the first time domain resource and is separated from the first time domain resource by the first time domain interval, as the second time domain resource.

For example, if the first time domain resource is a subframe n, and the first time domain interval is k, the UE may determine a subframe n–k as the second time domain resource, and further obtain the second information (data information) corresponding to the first information (acknowledgement information).

Optionally, in an embodiment, duration of the first time domain resource and the duration of the second time domain resource are equal to duration of a time domain unit of the first time domain interval. Specifically, the duration of the first time domain resource and the duration of the second time domain resource are equal to any one of the following: duration of one subframe in time domain; or duration of one timeslot in time domain; or duration of two symbols in time domain; or duration of four symbols in time domain.

Optionally, in another embodiment, the duration of the second time domain resource is shorter than or equal to duration of a time domain unit of the first time domain interval.

Optionally, in an implementation of this embodiment, the time domain unit of the first time domain interval is a subframe; and the processing module 1220 is further configured to obtain a second parameter value, where the second parameter value is used to indicate a location of the second time domain resource in a second subframe, and the second subframe is a subframe in which the second time domain resource is located; and determining, by the processing module 1220, the second time domain resource based on the first time domain interval and the first time domain resource includes: determining the second subframe based on the first time domain interval and a first subframe, where the first subframe is a subframe in which the first time domain resource is located; and determining the location of the second time domain resource in the second subframe based on the second parameter value.

Optionally, in another possible implementation of this embodiment, the time domain unit of the first time domain interval is a subframe, a relationship between a location of the first time domain resource in a first subframe and a location of the second time domain resource in a second subframe is predefined, the second subframe is a subframe in which the second time domain resource is located, and the first subframe is a subframe in which the first time domain resource is located; and a specific implementation of determining, by the processing module 1220, the second time domain resource based on the first time domain interval and the first time domain resource is: determining the second subframe based on the first time domain interval and the first subframe; and determining the location of the second time domain resource in the second subframe according to the relationship between the location of the first time domain resource in the first subframe and the location of the second time domain resource in the second subframe.

It should be understood that, the processing module 1220 may obtain the first parameter value in a plurality of manners. The first parameter value may be predefined, or sent by a base station to the UE.

Optionally, in an embodiment, a specific implementation of obtaining, by the processing module 1220, the first parameter value may be: obtaining indication information, where the indication information carries the first parameter value. The indication information may be sent together with the first information, or sent before the first information, or sent after the first information. This is not limited herein in this embodiment of the present invention.

Alternatively, optionally, a specific implementation of obtaining, by the processing module 1220, the first parameter value is: obtaining indication information, where the indication information corresponds to the first parameter value; and determining the first parameter value according to the indication information; where the indication information is any one of the following:

a maximum transmission timing advance TA value of the UE, a maximum transport block size TBS value of the UE, transmission mode information of the UE, capability information of the UE, or a duration type of the second time domain resource.

The user equipment 1200 may further perform the method in FIG. 6, and implement functions of the user equipment in the embodiment shown in FIG. 6. Details are not described again herein in this embodiment of the present invention.

Figure 13:
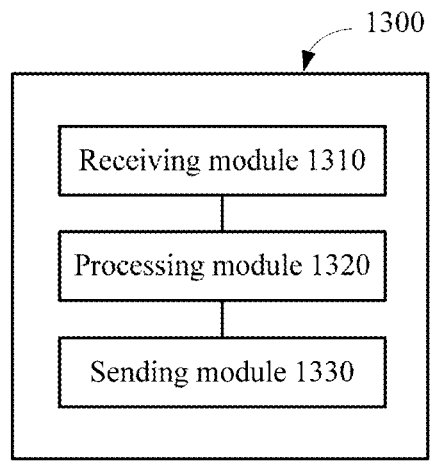
FIG. 13 is a schematic structural diagram of user equipment according to still another embodiment of the present invention.

FIG. 13 is a schematic structural diagram of user equipment 1300 according to an embodiment of the present invention. As shown in FIG. 13, the user equipment 1300 may include a sending module 1330, a receiving module 1310, and a processing module 1320, where the receiving module 1310 is configured to receive a configuration index, where the configuration index is used to indicate a transmission period of control information and a first time domain resource offset, and duration of a first time domain resource is shorter than one subframe;

the processing module 1320 is configured to determine a time domain resource for the control information based on a system frame number and the configuration index; and the sending module 1330 is configured to send the control information on the time domain resource.

In this embodiment of the present invention, to reduce a delay, in the transmission method, the UE shortens duration occupied by each transmission of control information, and determines a resource for transmitting the control information accordingly. Therefore, a transmission delay of the control information is reduced, and a speed of transmitting the control information such as CSI, an SR, and HARQ information is increased, a processing time of a whole system is reduced, and system performance is improved.

It should be understood that, in this embodiment of the present invention, the control information may include the CSI, the SR, the HARQ acknowledgement information, or the like.

Optionally, in an embodiment, a specific implementation of determining, by the processing module 1320, the time domain resource for the control information based on the system frame number and the configuration index is: determining a location of the time domain resource according to a product $M*n_f$ of a system frame number of and M, and the configuration index, where M is determined according to duration of the subframe and duration of the time domain resource, and M is a positive integer.

For example, the time domain resource may be determined according to a formula $(M \times n_f + n_s - N_{OFFSET}) \bmod (N_{pd}) = 0$. A value of M, for example, may be equal to the duration of the subframe divided by the duration of the time domain resource. If the duration of the subframe divided by the duration of the time domain resource is not an integer, an integer part is used as the value of M. To be specific, $M = \lfloor$ Duration of the subframe/Duration of the time domain resource$\rfloor$.

Alternatively, optionally, in another embodiment, a specific implementation of determining, by the processing module 1320, the time domain resource for the control information based on the system frame number and the configuration index is: determining a location of the time domain resource according to a product $M*10*n_f$ of a system frame number of and M, and the configuration index; where M is determined according to duration of the subframe and duration of the time domain resource, and M is a positive integer.

For example, the time domain resource may be determined according to a formula $(M \times n_f + n_s - N_{OFFSET}) \bmod (N_{pd}) = 0$.

Optionally, in an embodiment, the transmission period is shorter than duration of five subframes and longer than duration of one subframe in time domain. For example, a value of the transmission period may be two subframes, three subframes, or four subframes, or the like.

Optionally, in another embodiment, duration of a time domain unit of at least one of the transmission period and the first time domain resource offset indicated by the configuration index is the same as duration of the time domain resource in time domain.

For example, the time domain units of both the transmission period and the time domain resource offset are timeslots, and the duration of the time domain resource in time domain is also a timeslot. For another example, the time domain unit of the transmission period is a timeslot, the time domain unit of the time domain resource offset is a timeslot, and the duration of the time domain resource in time domain is also a timeslot.

Optionally, in another embodiment, a specific implementation of determining, by the processing module 1320, the time domain resource for the control information based on the system frame number and the configuration index is: determining the transmission period and the first time domain resource offset according to the configuration index; and determining the time domain resource based on the system frame number, the transmission period, the first time domain resource offset, and a second time domain resource offset; where the first time domain resource offset is an offset associated with a type of the control information, the first time domain resource offset is used to indicate an offset of the control information in the transmission period, and duration of the second time domain resource offset is equal to duration of one or more of the time domain resources, or duration of the second time domain resource offset is equal to duration of one subframe.

Further, the second time domain resource offset is predefined; or the second time domain resource offset is sent by a base station to the UE.

Optionally, in an embodiment, a specific implementation of determining, by the processing module 1320, the time domain resource for the control information based on the system frame number and the configuration index is: determining a candidate time domain resource based on the system frame number and the configuration index; and if the candidate time domain resource is an available uplink time domain resource, determining the candidate time domain resource as the time domain resource for the control information.

Alternatively, optionally, in another embodiment, a specific implementation of determining, by the processing module 1320, the time domain resource for the control information based on the system frame number and the configuration index is: determining a candidate time domain resource based on the system frame number and the configuration index; and if the candidate time domain resource is a downlink time domain resource or an unavailable time domain resource, determining a first available uplink time domain resource after the time domain resource as the time domain resource for the control information.

The user equipment 1300 may further perform the method in FIG. 7, and implement functions of the user equipment in the embodiment shown in FIG. 7. Details are not described again herein in this embodiment of the present invention.

Figure 14:
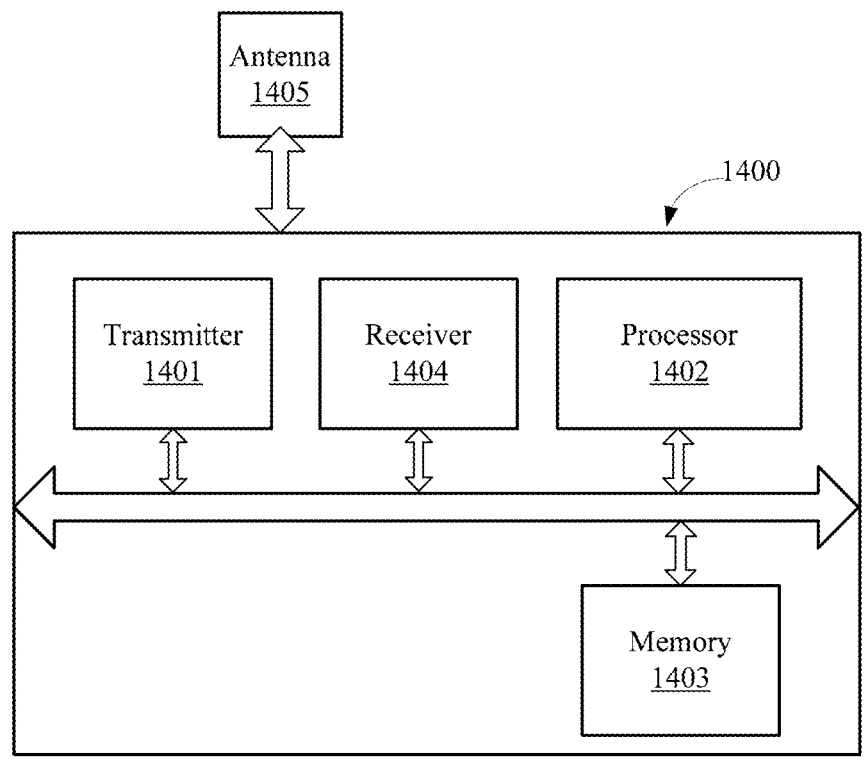
FIG. 14 is a schematic structural diagram of user equipment according to still another embodiment of the present invention.

FIG. 14 is a schematic structural diagram of user equipment 1400 according to still another embodiment of the present invention. A schematic structural diagram of an entity apparatus of the user equipment 1400, as shown in FIG. 14, may include a processor 1402, a memory 1403, a transmitter 1401, and a receiver 1404. In a specific application, the transmitter 1401 and the receiver 1404 may be coupled to an antenna 1405.

The memory 1403 is configured to store a program. Specifically, the program may include program code, where the program code includes a computer operation instruction. The memory 1403 may include a read-only memory and a random access memory, and provide an instruction and data to the processor 1402. The memory 1403 may include a high-speed RAM, or may further include a non-transitory memory, for example, at least one disk storage.

The processor 1402 executes the program stored in the memory 1403.

Specifically, in the user equipment 1400, the processor 1402 may perform the following method by using the receiver 1404 and the transmitter 1401:

receiving first information by using the receiver 1404, where the first information is used to instruct the UE to send second information;

obtaining a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes; and determining the second time domain resource based on the first parameter value, and sending the second information on the second time domain resource by using the transmitter 1401.

The foregoing method performed by the user equipment and disclosed by the embodiment of the present invention shown in FIG. 1 may be applied to the processor 1402 or implemented by the processor 1402. The processor 1402 may be an integrated circuit chip, and has a signal processing capability. In an implementation process, each step of the foregoing method may be completed by using an integrated logic circuit of hardware in the processor 1402 or an instruction in a form of software. The processor 1402 may be a general purpose processor, including a central processing unit (CPU), a network processor (NP), or the like; or may be a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logic block diagrams disclosed in the embodiments of the present invention. The general purpose processor may be a microprocessor, or the processor may be any conventional processor or the like. Steps of the methods disclosed in the embodiments of the present invention may be directly performed and completed by a hardware decoding processor, or may be performed and completed by using a combination of hardware in a decoding processor and a software module. The software module may be located in a mature storage medium in the field, such as a random access memory, a flash memory, a read-only memory, a programmable read-only memory, an electrically-erasable programmable memory, or a register. The storage medium is located in the memory 1403, and the processor 1402 reads information in the memory 1403 and completes the steps in the foregoing methods in combination with hardware of the processor.

Figure 15:
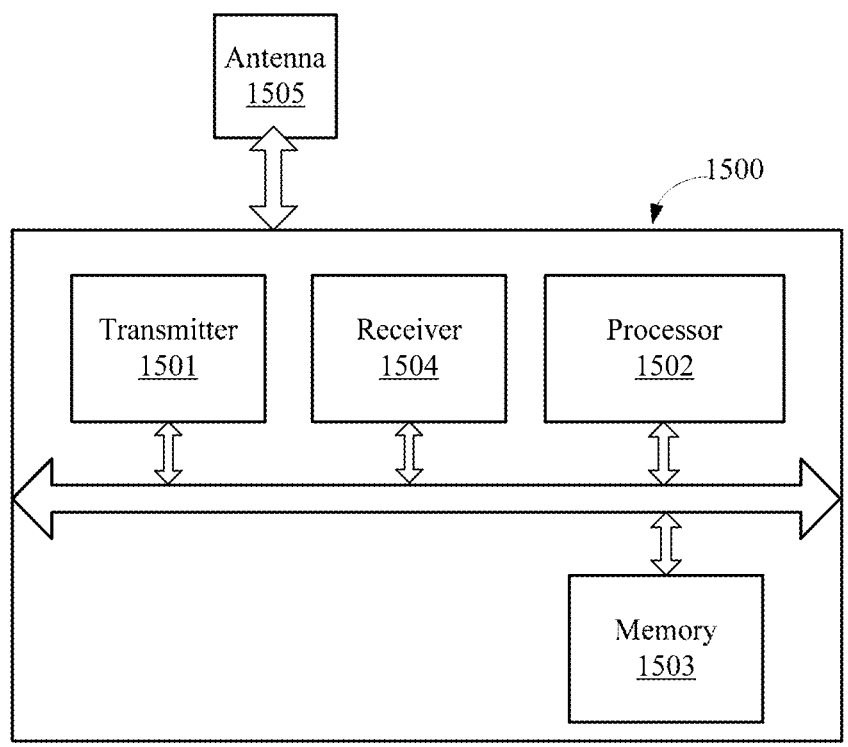
FIG. 15 is a schematic structural diagram of a base station according to still another embodiment of the present invention.

FIG. 15 is a schematic structural diagram of a base station 1500 according to still another embodiment of the present invention. A schematic structural diagram of an entity apparatus of the base station 1500, as shown in FIG. 15, may include a processor 1502, a memory 1503, a transmitter 1501, and a receiver 1504. In a specific application, the transmitter 1501 and the receiver 1504 may be coupled to an antenna 1505.

The memory 1503 is configured to store a program. Specifically, the program may include program code, where the program code includes a computer operation instruction. The memory 1503 may include a read-only memory and a random access memory, and provide an instruction and data to the processor 1502. The memory 1503 may include a high-speed RAM, or may further include a non-transitory memory, for example, at least one disk storage.

The processor 1502 executes the program stored in the memory 1503.

Specifically, in the base station 1500, the processor 1502 may perform the following method by using the receiver 1504 and the transmitter 1501:

sending first information by using the transmitter 1501, where the first information is used to instruct UE to send second information;

sending a first parameter value by using the transmitter 1501, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes; and determining the second time domain resource, and receiving the second information on the second time domain resource by using the receiver 1504.

The foregoing method performed by the base station and disclosed by the embodiment of the present invention shown in FIG. 3 may be applied to the processor 1502 or implemented by the processor 1502. The processor 1502 may be an integrated circuit chip, and has a signal processing capability. In an implementation process, each step of the foregoing method may be completed by using an integrated logic circuit of hardware in the processor 1502 or an instruction in a form of software. The processor 1502 may be a general purpose processor, including a central processing unit (CPU), a network processor (NP), or the like; or may be a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logic block diagrams disclosed in the embodiments of the present invention. The general purpose processor may be a microprocessor, or the processor may be any conventional processor or the like. Steps of the methods disclosed in the embodiments of the present invention may be directly performed and completed by a hardware decoding processor, or may be performed and completed by using a combination of hardware in a decoding processor and a software module. The software module may be located in a mature storage medium in the field, such as a random access memory, a flash memory, a read-only memory, a programmable read-only memory, an electrically-erasable programmable memory, or a register. The storage medium is located in the memory 1503, and the processor 1502 reads information in the memory 1503 and completes the steps in the foregoing methods in combination with hardware of the processor.

Figure 16:
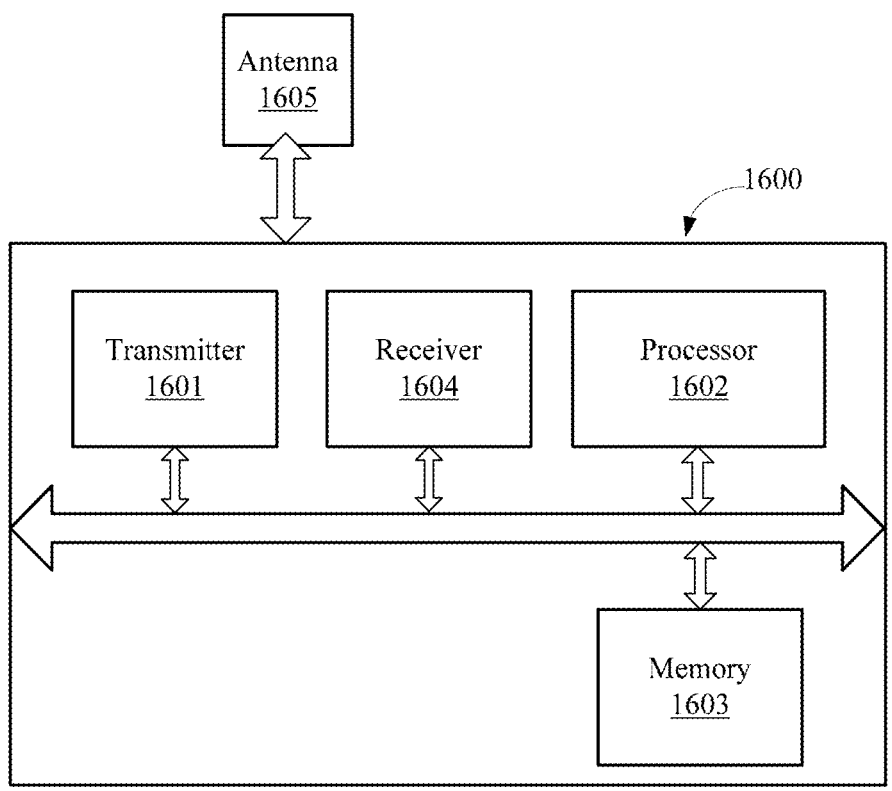
FIG. 16 is a schematic structural diagram of user equipment according to still another embodiment of the present invention.

FIG. 16 is a schematic structural diagram of user equipment 1600 according to still another embodiment of the present invention. A schematic structural diagram of an entity apparatus of the user equipment 1600, as shown in FIG. 16, may include a processor 1602, a memory 1603, a transmitter 1601, and a receiver 1604. In a specific application, the transmitter 1601 and the receiver 1604 may be coupled to an antenna 1605.

The memory 1603 is configured to store a program. Specifically, the program may include program code, where the program code includes a computer operation instruction. The memory 1603 may include a read-only memory and a random access memory, and provide an instruction and data to the processor 1602. The memory 1603 may include a high-speed RAM, or may further include a non-transitory memory, for example, at least one disk storage.

The processor 1602 executes the program stored in the memory 1603.

Specifically, in the user equipment 1600, the processor 1602 may perform the following method by using the receiver 1604 and the transmitter 1601:

sending first information by using the transmitter 1601, where the first information is data information;

obtaining a first parameter value, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes; and determining the second time domain resource based on the first parameter value, and receiving the second information on the second time domain resource by using the receiver 1604.

The foregoing method performed by the user equipment and disclosed by the embodiment of the present invention shown in FIG. 4 may be applied to the processor 1602 or implemented by the processor 1602. The processor 1602 may be an integrated circuit chip, and has a signal processing capability. In an implementation process, each step of the foregoing method may be completed by using an integrated logic circuit of hardware in the processor 1602 or an instruction in a form of software. The processor 1602 may be a general purpose processor, including a central processing unit (CPU), a network processor (NP), or the like; or may be a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logic block diagrams disclosed in the embodiments of the present invention. The general purpose processor may be a microprocessor, or the processor may be any conventional processor or the like. Steps of the methods disclosed in the embodiments of the present invention may be directly performed and completed by a hardware decoding processor, or may be performed and completed by using a combination of hardware in a decoding processor and a software module. The software module may be located in a mature storage medium in the field, such as a random access memory, a flash memory, a read-only memory, a programmable read-only memory, an electrically-erasable programmable memory, or a register. The storage medium is located in the memory 1603, and the processor 1602 reads information in the memory 1603 and completes the steps in the foregoing methods in combination with hardware of the processor.

Figure 17:
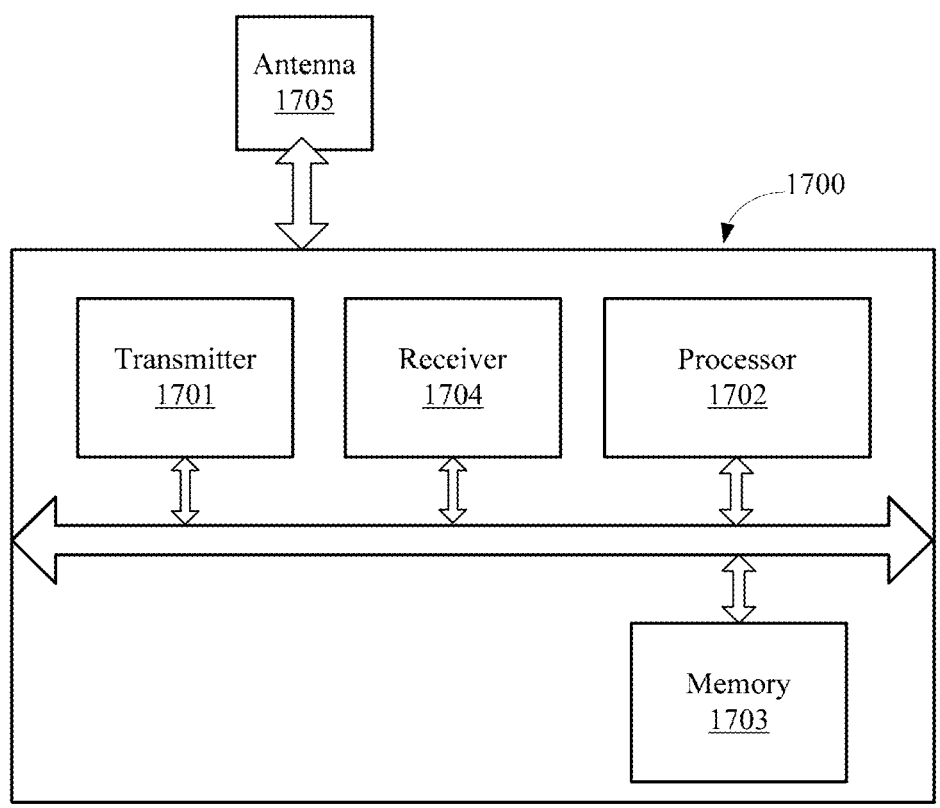
FIG. 17 is a schematic structural diagram of a base station according to still another embodiment of the present invention.

FIG. 17 is a schematic structural diagram of a base station 1700 according to still another embodiment of the present invention. A schematic structural diagram of an entity apparatus of the base station 1700, as shown in FIG. 17, may include a processor 1702, a memory 1703, a transmitter 1701, and a receiver 1704. In a specific application, the transmitter 1701 and the receiver 1704 may be coupled to an antenna 1705.

The memory 1703 is configured to store a program. Specifically, the program may include program code, where the program code includes a computer operation instruction. The memory may include a read-only memory and a random access memory, and provide an instruction and data to the processor 1702. The memory 1703 may include a high-speed RAM, or may further include a non-transitory memory, for example, at least one disk storage.

The processor 1702 executes the program stored in the memory 1703.

Specifically, in the base station 1700, the processor 1702 may perform the following method by using the receiver 1704 and the transmitter 1701:

receiving first information by using the receiver 1704, where the first information is data information;

sending a first parameter value by using the transmitter 1701, where the first parameter value is used to indicate a location relationship between a first time domain resource and a second time domain resource, the first time domain resource is a time domain resource in which the first information is located, the second time domain resource is a time domain resource in which second information is located, the second information is acknowledgement information about the first information, duration of the second time domain resource is not longer than one subframe, and an interval between the second time domain resource and the first time domain resource is shorter than four subframes; and determining the second time domain resource, and sending the second information on the second time domain resource by using the transmitter 1701.

The foregoing method performed by the base station and disclosed by the embodiment of the present invention shown in FIG. 5 may be applied to the processor 1702 or implemented by the processor 1702. The processor 1702 may be an integrated circuit chip, and has a signal processing capability. In an implementation process, each step of the foregoing method may be completed by using an integrated logic circuit of hardware in the processor 1702 or an instruction in a form of software. The processor 1702 may be a general purpose processor, including a central processing unit (CPU), a network processor (NP), or the like; or may be a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logic block diagrams disclosed in the embodiments of the present invention. The general purpose processor may be a microprocessor, or the processor may be any conventional processor or the like. Steps of the methods disclosed in the embodiments of the present invention may be directly performed and completed by a hardware decoding processor, or may be performed and completed by using a combination of hardware in a decoding processor and a software module. The software module may be located in a mature storage medium in the field, such as a random access memory, a flash memory, a read-only memory, a programmable read-only memory, an electrically-erasable programmable memory, or a register. The storage medium is located in the memory 1703, and the processor 1702 reads information in the memory 1703 and completes the steps in the foregoing methods in combination with hardware of the processor.

Figure 18:
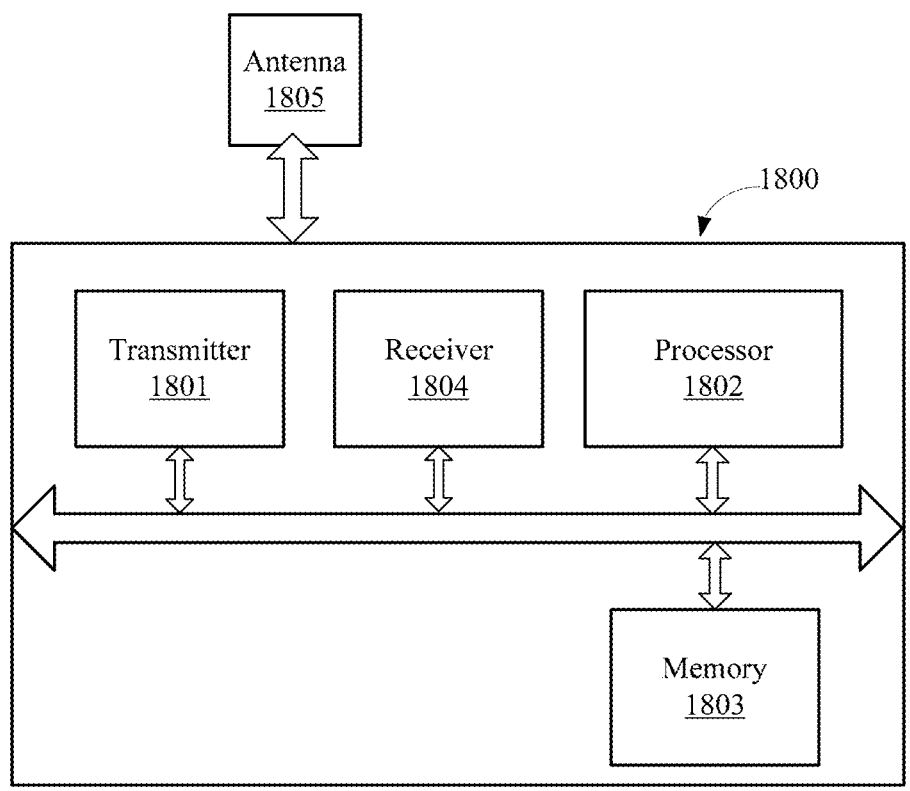
FIG. 18 is a schematic structural diagram of user equipment according to still another embodiment of the present invention.

FIG. 18 is a schematic structural diagram of user equipment 1800 according to still another embodiment of the present invention. A schematic structural diagram of an entity apparatus of the user equipment 1800, as shown in FIG. 18, may include a processor 1802, a memory 1803, a transmitter 1801, and a receiver 1804. In a specific application, the transmitter 1801 and the receiver 1804 may be coupled to an antenna 1805.

The memory 1803 is configured to store a program. Specifically, the program may include program code, where the program code includes a computer operation instruction. The memory 1803 may include a read-only memory and a random access memory, and provide an instruction and data to the processor 1802. The memory 1803 may include a high-speed RAM, or may further include a non-transitory memory, for example, at least one disk storage.

The processor 1802 executes the program stored in the memory 1803.

Specifically, in the user equipment 1800, the processor 1802 may perform the following method by using the receiver 1804 and the transmitter 1801:

receiving first information by using the receiver 1804, where the first information is acknowledgement information about second information, and the second information is data information;

obtaining a first parameter value, where the first parameter value is used to indicate a location relationship between a first time domain resource and a second time domain resource, the first time domain resource is a time domain resource in which the first information is located, the second time domain resource is a time domain resource in which the second information is located, duration of the second time domain resource is not longer than one subframe, and an interval between the second time domain resource and the first time domain resource is shorter than four subframes; and determining the second time domain resource based on the first parameter value.

The foregoing method performed by the user equipment and disclosed by the embodiment of the present invention shown in FIG. 6 may be applied to the processor 1802 or implemented by the processor 1802. The processor 1802 may be an integrated circuit chip, and has a signal processing capability. In an implementation process, each step of the foregoing method may be completed by using an integrated logic circuit of hardware in the processor 1802 or an instruction in a form of software. The processor 1802 may be a general purpose processor, including a central processing unit (CPU), a network processor (NP), or the like; or may be a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logic block diagrams disclosed in the embodiments of the present invention. The general purpose processor may be a microprocessor, or the processor may be any conventional processor or the like. Steps of the methods disclosed in the embodiments of the present invention may be directly performed and completed by a hardware decoding processor, or may be performed and completed by using a combination of hardware in a decoding processor and a software module. The software module may be located in a mature storage medium in the field, such as a random access memory, a flash memory, a read-only memory, a programmable read-only memory, an electrically-erasable programmable memory, or a register. The storage medium is located in the memory 1803, and the processor 1802 reads information in the memory 1803 and completes the steps in the foregoing methods in combination with hardware of the processor.

Figure 19:
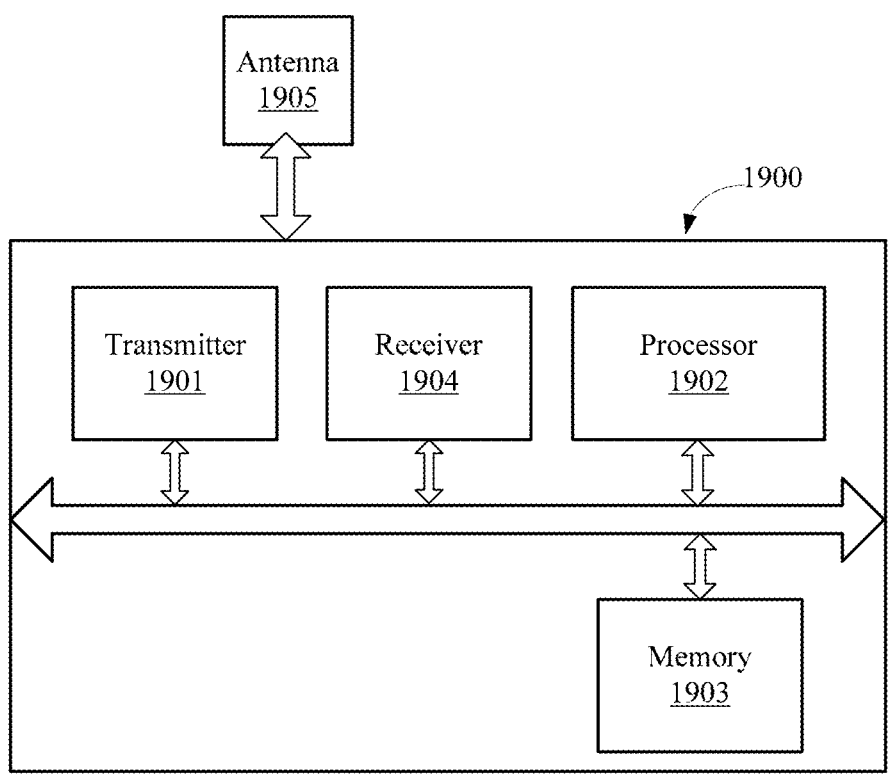
FIG. 19 is a schematic structural diagram of user equipment according to still another embodiment of the present invention.

FIG. 19 is a schematic structural diagram of user equipment 1900 according to still another embodiment of the present invention. A schematic structural diagram of an entity apparatus of the user equipment 1900, as shown in FIG. 19, may include a processor 1902, a memory 1903, a transmitter 1901, and a receiver 1904. In a specific application, the transmitter 1901 and the receiver 1904 may be coupled to an antenna 1905.

The memory 1903 is configured to store a program. Specifically, the program may include program code, where the program code includes a computer operation instruction. The memory 1903 may include a read-only memory and a random access memory, and provide an instruction and data to the processor 1902. The memory 1903 may include a high-speed RAM, or may further include a non-transitory memory, for example, at least one disk storage.

The processor 1902 executes the program stored in the memory 1903.

Specifically, in the user equipment 1900, the processor 1902 may perform the following method by using the receiver 1904 and the transmitter 1901:

receiving a configuration index by using the receiver 1904, where the configuration index is used to indicate a transmission period of control information and a first time domain resource offset, and duration of the first time domain resource is shorter than one subframe;

determining a time domain resource for the control information based on a system frame number and the configuration index; and sending the control information on the time domain resource by using the transmitter 1901.

The foregoing method performed by the user equipment and disclosed by the embodiment of the present invention shown in FIG. 7 may be applied to the processor 1902 or implemented by the processor 1902. The processor 1902 may be an integrated circuit chip, and has a signal processing capability. In an implementation process, each step of the foregoing method may be completed by using an integrated logic circuit of hardware in the processor 1902 or an instruction in a form of software. The processor 1902 may be a general purpose processor, including a central processing unit (CPU), a network processor (NP), or the like; or may be a digital signal processor (DSP), an application-specific integrated circuit (ASIC), a field programmable gate array (FPGA) or another programmable logic device, a discrete gate or transistor logic device, or a discrete hardware component. The processor may implement or execute the methods, steps, and logic block diagrams disclosed in the embodiments of the present invention. The general purpose processor may be a microprocessor, or the processor may be any conventional processor or the like. Steps of the methods disclosed in the embodiments of the present invention may be directly performed and completed by a hardware decoding processor, or may be performed and completed by using a combination of hardware in a decoding processor and a software module. The software module may be located in a mature storage medium in the field, such as a random access memory, a flash memory, a read-only memory, a programmable read-only memory, an electrically-erasable programmable memory, or a register. The storage medium is located in the memory 1903, and the processor 1902 reads information in the memory 1903 and completes the steps in the foregoing methods in combination with hardware of the processor.

An embodiment of the present invention further provides a computer-readable storage medium, configured to store a computer program, where the computer program includes an instruction used to perform the method performed by the user equipment in the embodiment shown in FIG. 1.

An embodiment of the present invention further provides another computer-readable storage medium, configured to store a computer program, where the computer program includes an instruction used to perform the method performed by the base station in the embodiment shown in FIG. 3.

An embodiment of the present invention further provides still another computer-readable storage medium, configured to store a computer program, where the computer program includes an instruction used to perform the method performed by the user equipment in the embodiment shown in FIG. 4.

An embodiment of the present invention further provides still another computer-readable storage medium, configured to store a computer program, where the computer program includes an instruction used to perform the method performed by the base station in the embodiment shown in FIG. 5.

An embodiment of the present invention further provides still another computer-readable storage medium, configured to store a computer program, where the computer program includes an instruction used to perform the method performed by the user equipment in the embodiment shown in FIG. 6.

An embodiment of the present invention further provides still another computer-readable storage medium, configured to store a computer program, where the computer program includes an instruction used to perform the method performed by the user equipment in the embodiment shown in FIG. 7.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing stor- The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving a configuration index;
   determining a transmission period of control information, and a first offset of a time domain resource according to the configuration index, wherein a duration of the time domain resource is shorter than one subframe;
   determining the time domain resource based on a system frame number, the transmission period, the first offset of the time domain resource, and a second offset of the time domain resource;
   wherein the determining the time domain resource comprises:
      determining a location of the time domain resource according to the transmission period, the first offset of the time domain resource and $M*10*n_f$, wherein the $n_f$ is the system frame number, and the M is a positive integer; and
   sending the control information on the time domain resource.

2. The method according to claim 1, wherein the second offset of the time domain resource is received from a base station.

3. The method according to claim 1, wherein the first offset of the time domain resource is an offset associated with a type of the control information, the first offset of the time domain resource indicates the offset of the control information in the transmission period, the duration of the second offset of the time domain resource is equal to one or more durations of the time domain resource.

4. The method according to claim 1, wherein the control information comprises channel state information (CSI), a scheduling request (SR), or hybrid automatic repeat request (HARQ) acknowledgement information.

5. The method according to claim 1, wherein the duration of a time domain unit of at least one of the transmission period and the first offset of the time domain resource indicated by the configuration index is same as duration of the time domain resource in time domain.

6. The method according to claim 1, wherein the location of the time domain resource meets $(M \times 10 \times n_f + n_s - N_{OFFSET}) \bmod(N_{pd}) = 0$, wherein $n_s$ indicates a time domain location of the time domain resource, $N_{offset}$ is the first offset of the time domain resource, $N_{pd}$ is the transmission period of the control information.

7. The method according to claim 1, wherein determining the time domain resource comprises:
   determining a candidate time domain resource based on the system frame number, the transmission period, the first offset of the time domain resource, and the second offset of the time domain resource; and
   when the candidate time domain resource is an available uplink time domain resource, determining the candidate time domain resource as the time domain resource; or
   when the candidate time domain resource is a downlink time domain resource or an unavailable time domain resource, determining a first available uplink time domain resource after the time domain resource as the time domain resource.

8. The method according to claim 1, wherein the duration of the time domain resource is equal to any one of the following: duration of one timeslot in time domain, duration of two symbols in the time domain, or duration of four symbols in the time domain.

9. An apparatus, comprising:
   a transceiver;
   at least one processor; and
   one or more memories coupled to the at least one processor and storing programming instructions for execution by the at least one processor to:
      cause the transceiver to receive a configuration index;
      determine a transmission period of control information, and a first offset of a time domain resource according to the configuration index, wherein a duration of the time domain resource is shorter than one subframe; and
      determine the time domain resource based on a system frame number, the transmission period, the first offset of the time domain resource, and a second offset of the time domain resource;
      wherein the determine the time domain resource comprises:
   determine a location of the time domain resource according to the transmission period, the first offset of the time domain resource and $M*10*n_f$, wherein the of is the system frame number, and the M is a positive integer; and
   cause the transceiver to send the control information on the time domain resource.

10. The apparatus according to claim 9, wherein the second offset of the time domain resource is received from a base station.

11. The apparatus according to claim 9, wherein the first offset of the time domain resource is an offset associated with a type of the control information, the first offset of the time domain resource indicates the offset of the control information in the transmission period, and the duration of the second offset of the time domain resource is equal to one or more durations of the time domain resource.

12. The apparatus according to claim 9, wherein the control information comprises channel state information (CSI), a scheduling request (SR), or hybrid automatic repeat request (HARM) acknowledgement information.

13. The apparatus according to claim 9, wherein the duration of a time domain unit of at least one of the transmission period and the first offset of the time domain resource indicated by the configuration index is same as the duration of the time domain resource in time domain.

14. The apparatus according to claim 9, wherein the location of the time domain resource meets $(M \times 10 \times n_f + n_s - N_{OFFSET}) \bmod(N_{pd}) = 0$, wherein $n_s$ indicates a time domain location of the time domain resource, $N_{offset}$ is the first offset of the time domain resource, $N_{pd}$ is the transmission period of the control information.

15. The apparatus according to claim 9, wherein the duration of the time domain resource is equal to any one of the following: duration of one timeslot in time domain, duration of two symbols in the time domain, or duration of four symbols in the time domain.

16. The apparatus according to claim 9, wherein the apparatus is user equipment.

17. A non-transitory computer readable storage medium comprising processor-executable instructions, which, when executed by a processor of a computer, cause the computer to implement:
 receiving a configuration index;
 determining a transmission period of control information and a first offset of a time domain resource according to the configuration index, wherein a duration of the time domain resource is shorter than one subframe;
 determining the time domain resource based on a system frame number, the transmission period, the first offset of the time domain resource, and a second offset of the time domain resource;
 wherein the determining the time domain resource comprises:
  determining a location of the time domain resource according to the transmission period, the first offset of the time domain resource and $M*10*n_f$, wherein the $n_f$ is the system frame number, and the M is a positive integer; and
 sending the control information on the time domain resource.

18. The non-transitory computer readable storage medium according to claim 17, wherein the second offset of the time domain resource is received from a base station.

19. The non-transitory computer readable storage medium according to claim 17, wherein the first offset of the time domain resource is an offset associated with a type of the control information, the first offset of the time domain resource indicates the offset of the control information in the transmission period, and the duration of the second offset of the time domain resource is equal to one or more durations of the time domain resource.

20. The non-transitory computer readable storage medium according to claim 17, wherein the control information comprises channel state information (CSI), a scheduling request (SR), or hybrid automatic repeat request (HARM) acknowledgement information.

21. The non-transitory computer readable storage medium according to claim 17, wherein the duration of a time domain unit of at least one of the transmission period and the first offset of the time domain resource indicated by the configuration index is same as the duration of the time domain resource in time domain.

22. The non-transitory computer readable storage medium according to claim 17, wherein the location of the time domain resource meets $(M \times 10 \times n_f + n_s - N_{OFFSET}) \mod(N_{pd}) = 0$, wherein $n_s$ indicates a time domain location of the time domain resource, $N_{offset}$ is the first offset of the time domain resource, $N_{pd}$ is the transmission period of the control information.

23. The non-transitory computer readable storage medium according to claim 17, wherein
 the determining the time domain resource comprises:
  determining a candidate time domain resource based on the system frame number, the transmission period, the first offset of the time domain resource, and the second offset of the time domain resource; and
  when the candidate time domain resource is an available uplink time domain resource, determining the candidate time domain resource as the time domain resource; or
  when the candidate time domain resource is a downlink time domain resource or an unavailable time domain resource, determining a first available uplink time domain resource after the time domain resource as the time domain resource.

24. The non-transitory computer readable storage medium according to claim 17, wherein the duration of the time domain resource is equal to any one of the following: duration of one timeslot in time domain, duration of two symbols in the time domain, or duration of four symbols in the time domain.

* * * * *